(12) United States Patent
Suzuki

(10) Patent No.: US 11,934,719 B2
(45) Date of Patent: Mar. 19, 2024

(54) PRINTING SYSTEM CAPABLE OF PRINTING IN ANY OF MULTIPLE POWER MODES AND CONTROL METHOD FOR PRINTING APPARATUS

(71) Applicant: CANON KABUSHIKI KAISHA, Tokyo (JP)

(72) Inventor: Masaki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/188,262

(22) Filed: Mar. 22, 2023

(65) Prior Publication Data
US 2023/0305767 A1 Sep. 28, 2023

(30) Foreign Application Priority Data
Mar. 24, 2022 (JP) .................................. 2022-048226

(51) Int. Cl.
| G06F 3/12 | (2006.01) |
| B41J 2/32 | (2006.01) |
| B41J 29/38 | (2006.01) |
| G03G 15/00 | (2006.01) |
| G06F 3/06 | (2006.01) |

(52) U.S. Cl.
CPC ............. G06F 3/1229 (2013.01); B41J 2/32 (2013.01); B41J 29/38 (2013.01); G06F 3/1203 (2013.01); *G03G 15/5004* (2013.01); *G06F 3/0625* (2013.01)

(58) Field of Classification Search
None
See application file for complete search history.

(56) References Cited

U.S. PATENT DOCUMENTS

| 8,823,984 B2 * | 9/2014 | Narita ................... G06F 1/3284 |
| | | 358/1.15 |
| 2002/0033872 A1 | 3/2002 | Takahashi |
| 2015/0195417 A1 * | 7/2015 | Ohhashi ............ H04N 1/00896 |
| | | 358/1.14 |
| 2016/0059601 A1 * | 3/2016 | Arimori ............... B41J 2/04548 |
| | | 347/19 |
| 2018/0188680 A1 * | 7/2018 | Kato ........................ B41J 29/38 |
| 2019/0196565 A1 * | 6/2019 | Shimamura ............. G06F 1/329 |
| 2019/0238705 A1 * | 8/2019 | Shimamura ........... H02J 7/0068 |

FOREIGN PATENT DOCUMENTS

| JP | 2015001699 A | 1/2015 |
| JP | 2019111759 A | 7/2019 |

* cited by examiner

*Primary Examiner* — Haris Sabah
(74) *Attorney, Agent, or Firm* — Canon U.S.A., Inc. IP Division

(57) ABSTRACT

A printing system that enables a user to determine the number of sheets that a printing apparatus can print, the number of sheets corresponding to a power supply source that supplies power to the printing apparatus, in any power mode. The printing apparatus performs printing in any of a plurality of power modes including (i) a first power mode in which the printing apparatus is supplied with power from the battery, and (ii) a second power mode in which the printing apparatus is supplied with power supplied from both the battery and an external power supply. In the second power mode, the number of sheets that the printing apparatus can print is calculated based on the remaining battery level of the battery and an amount of power supplied from the external power supply.

21 Claims, 13 Drawing Sheets

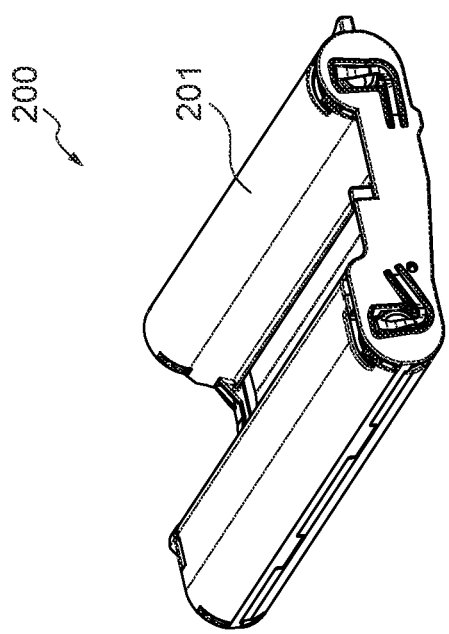
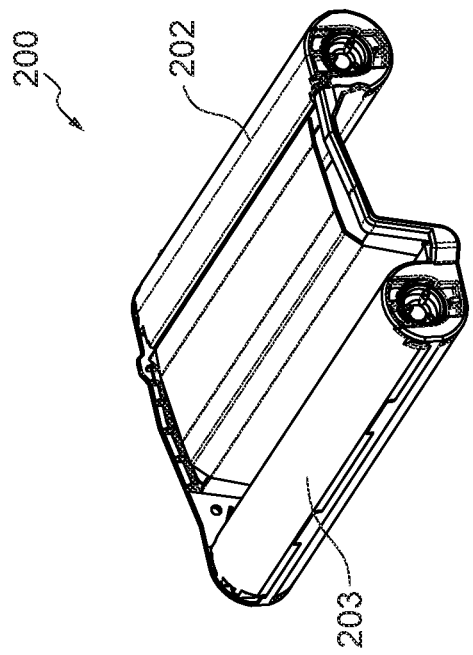

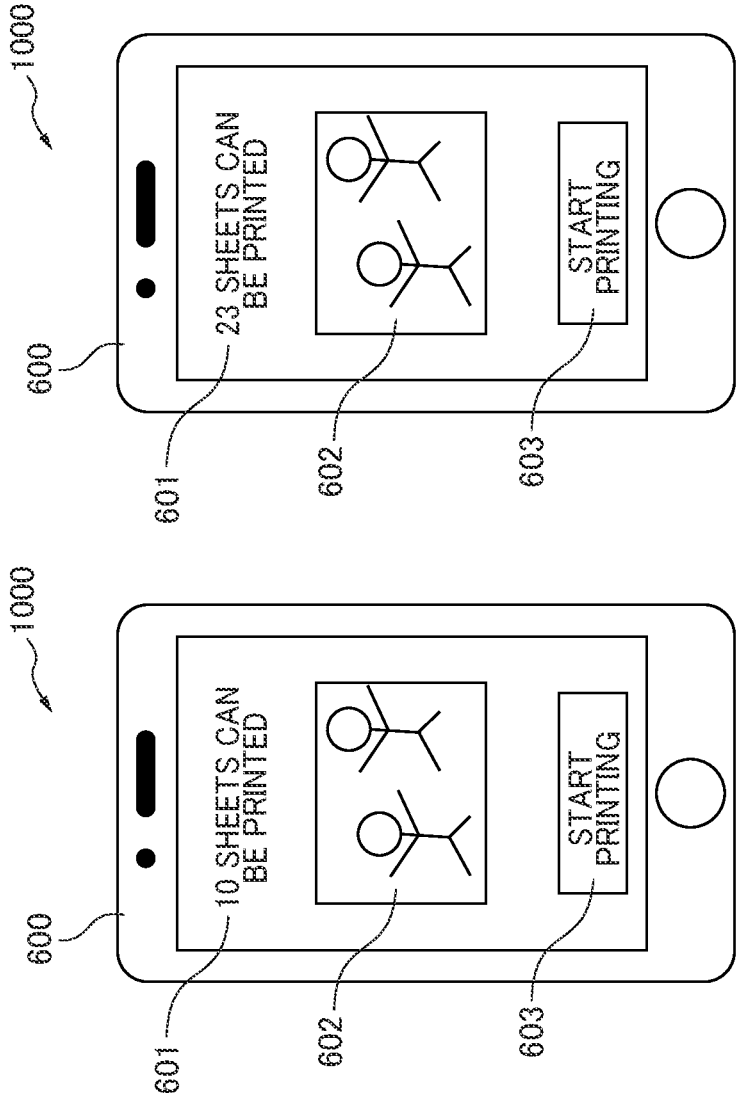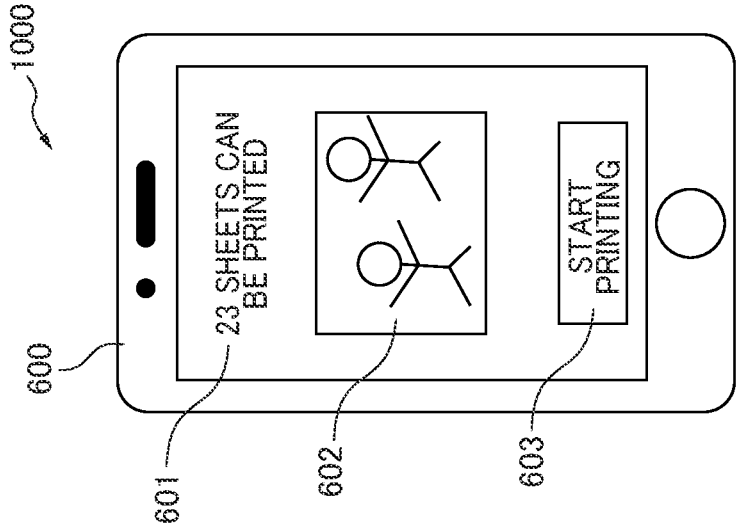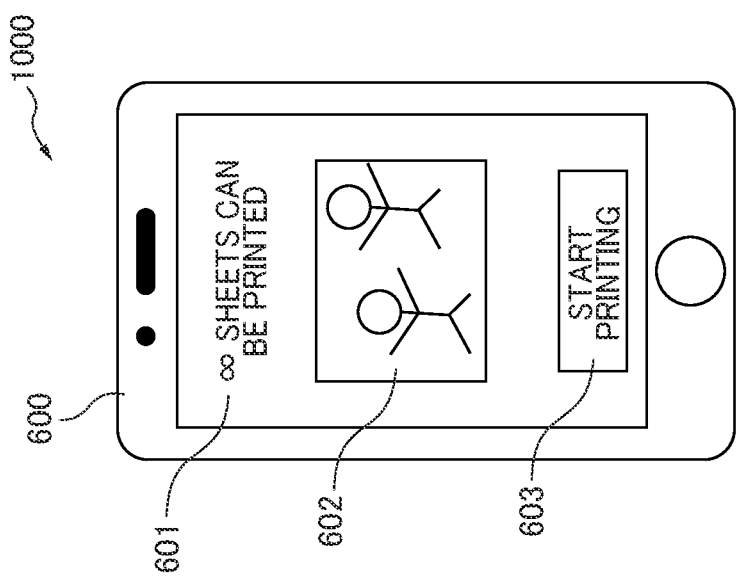

PRINTING SYSTEM CAPABLE OF PRINTING IN ANY OF MULTIPLE POWER MODES AND CONTROL METHOD FOR PRINTING APPARATUS

BACKGROUND

Field

The present disclosure relates to printing systems and control methods for printing apparatuses.

Description of the Related Art

Printing apparatuses (printers) capable of printing with power being supplied from a built-in battery or an external power supply are known. Some of such printing apparatuses are operable in connection with multiple types of external power supply that supply different amounts of power. In some cases, the printing apparatuses are capable of printing corresponding to the type of power supply source that actually supplies power to the printing apparatuses, i.e., corresponding to whether the power supply source is a built-in battery or an external power supply (see Japanese Laid-Open Patent Publication (Kokai) No. 2019-111759).

In such printing apparatuses, when there is a shortage of power supplied from the external power supply, the shortage may be made up for by power supplied from the built-in battery. However, a user of such printing apparatuses may not know how much power will be supplied from the external power supply versus from a built-in battery when the printing apparatus is ready to perform printing using an external power supply. It may be difficult for the user to determine whether the printing apparatus is performing printing using only power supplied from the external power supply or is performing printing using power supplied from the built-in battery as well as using power supplied from the external power supply. It can thus also be difficult for the user to determine the maximum number of sheets that the printing apparatus can print given a current power supply situation.

SUMMARY

Various embodiments of the present disclosure provide a printing system that allows a user to determine the number of sheets that a printing apparatus can print, the number of sheets corresponding to a power supply source that supplies power to the printing apparatus, and the number of sheets being irrespective of a power mode in which the printing apparatus is operating, e.g., whether the power supply source is a battery, an external power supply, or both a battery and an external power supply. Various embodiments of the present disclosure also provide control methods for printing apparatuses that allow a user to determine the number of sheets that the printing apparatus can print, the number of sheets corresponding to the power supply source that is being used.

According to one embodiment of the present disclosure, a printing system includes a printing apparatus that performs printing in any of a plurality of power modes including a first power mode in which the printing apparatus is supplied with power from a battery, and a second power mode in which the printing apparatus is supplied with power from both the battery and an external power supply. The printing system further includes a battery level detection unit that detects a remaining battery level of the battery, and a calculation unit that, in the second power mode, calculates the number of sheets that the printing apparatus can print, based on the remaining battery level and the amount of power supplied from the external power supply.

According to another embodiment of the present disclosure, a printing system includes a printing apparatus that has, as power modes, a first power mode in which the printing apparatus is supplied with power from a battery, a second power mode in which the printing apparatus is supplied with power from both the battery and an external power supply, and a third power mode in which the printing apparatus is supplied with power from the external power supply. The printing apparatus performs printing in any of the first power mode, the second power mode, and the third power mode. The printing system further includes a display unit, and a control unit that, in a case where the amount of power supplied from the external power supply is equal to or greater than a predetermined value, controls the printing apparatus to perform printing in the third power mode and causes the display unit to indicate that the number of sheets that the printing apparatus can print is infinite.

According to another embodiment of the present disclosure, a control method for a printing apparatus that performs printing in any of a plurality of power modes including the first power mode and the second power mode is provided. The control method includes obtaining a remaining battery level of the battery. The control method further includes, in the first power mode, calculating the number of sheets that the printing apparatus can print, based on a remaining battery level, and in the second power mode, calculating the number of sheets that the printing apparatus can print, based on the remaining battery level and the amount of power supplied from an external power supply.

According to another embodiment of the present disclosure, a control method for a printing apparatus that has, as power modes, the first power mode, the second power mode, and the third power mode is provided. The printing apparatus performs printing in any of the first power mode, the second power mode, and the third power mode. The control method includes controlling the printing apparatus to perform printing in the third power mode in a case where the amount of power supplied from an external power supply is equal to or greater than a predetermined value. The control method further includes, in a case where printing is performed in the third power mode, causing a display unit to indicate that the number of sheets that the printing apparatus can print is infinite.

According to various embodiments of the present disclosure, the printing system allows a user to determine the number of sheets that the printing apparatus can print, the number of sheets corresponding to a power supply source being used, in any of available power modes.

Further features of the present disclosure will become apparent from the following description of example embodiments with reference to the attached drawings.

BRIEF DESCRIPTION OF THE DRAWINGS

FIGS. 2A and 2B illustrate external perspective views of an ink ribbon cassette to be installed in the printer in FIGS. 1A and 1B.

FIGS. 12A, 12B, and 12C illustrate external views of an external device according to one or more embodiments of the present disclosure.

DESCRIPTION OF THE EMBODIMENTS

Various embodiments of the present disclosure will now be described in detail below with reference to the accompanying drawings.

Figure 1A:
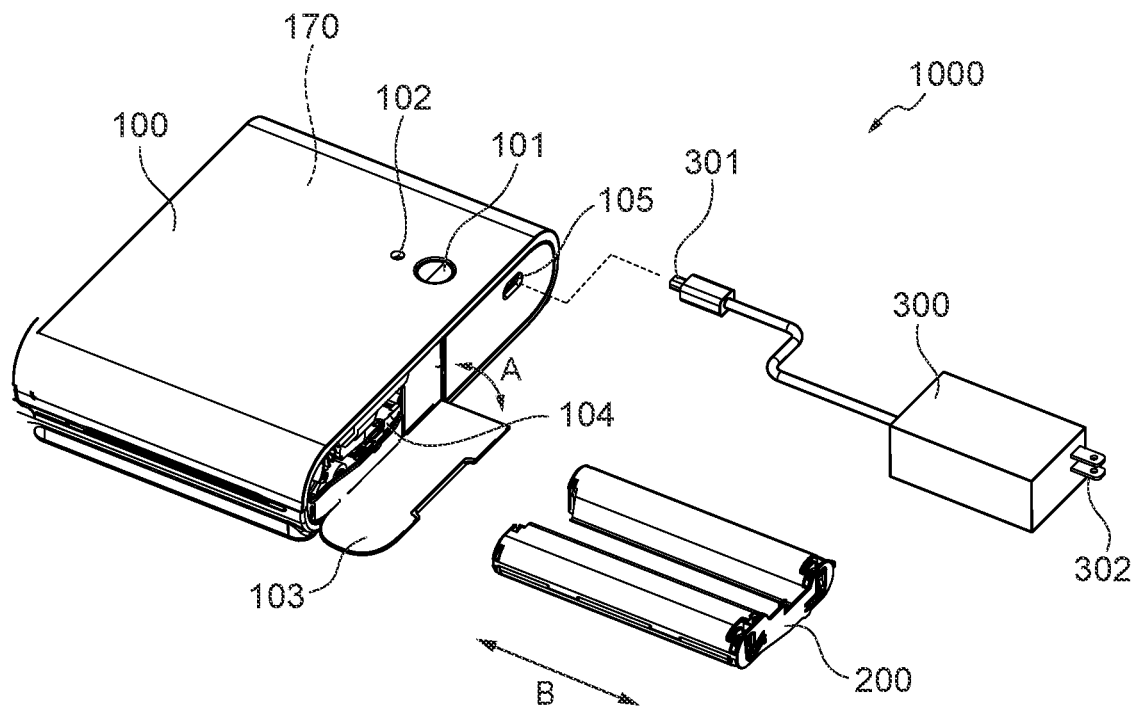
FIGS. 1A and 1B illustrate external perspective views of a printer (printing apparatus) according to one or more embodiments of the present disclosure.
Figure 1B:
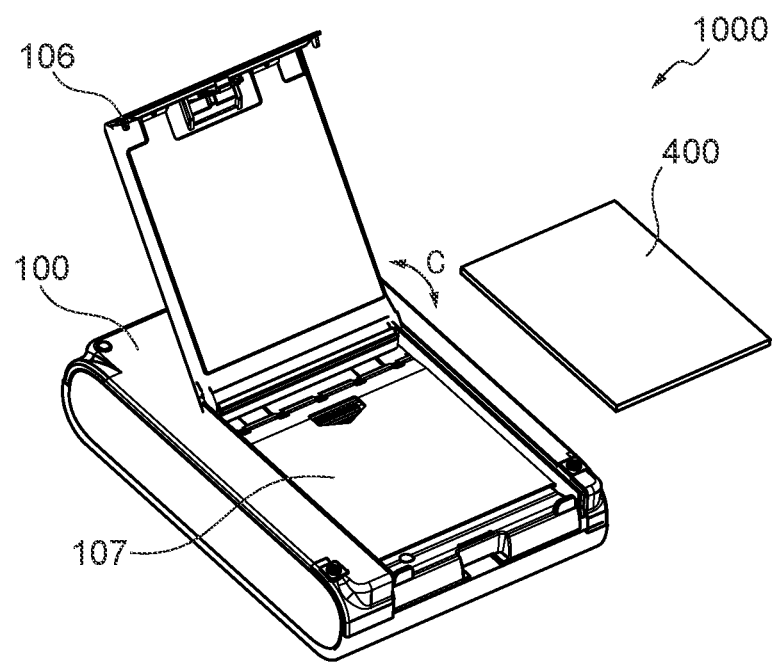

FIGS. 1A and 1B illustrate external perspective views of a printer (printing apparatus) 100 according to the present embodiment. FIG. 1A illustrates an external perspective view of the printer 100 as viewed from the front (from the top surface side), and FIG. 1B illustrates an external perspective view of the printer 100 as viewed from the rear (from the bottom surface side). It should be noted that the printer (printing apparatus) 100 in the present embodiment is described as being a portable printer as an example, but any type of printer may be used as the printer (printing apparatus) 100. The printer 100 as well as an external device (display device) 600 (see FIGS. 12A, 12B, 12C, and 13), which will be described later, constitute a printing system 1000.

As illustrated in FIG. 1A, an ink ribbon cassette 200 is installed in the printer 100, and an external power supply 300 is connectable to the printer 100. A built-in battery 170 is also installed in the printer 100.

A power button 101 and an indicator 102 are provided on a top surface of the printer 100. Depressing the power button 101 turns on the power to the printer 100, bringing the printer 100 into a power-on state. The indicator 102 is a pilot lamp comprised of an LED capable of blinking and lighting up. The indicator 102 is configured to light up in a predetermined color when the printer 100 is in the power-on state.

The printer 100 includes a cover 103 and a connector 105. The cover 103 is supported by a side face of the printer 100 such that it is openable and closable in a direction indicated by an arrow A in FIG. 1A. The connector 105 is electrically connectable to the external power supply 300. With the cover 103 opened, the ink ribbon cassette 200 can be inserted into and removed from an ink ribbon cassette insertion opening 104 in a direction indicated by an arrow B in FIG. 1A. The connector 105 is, for example, a USB Type-C connector (receptacle).

The external power supply 300 is an AC adapter including a connector 301 and a connection terminal 302. The connection terminal 302 is configured to be connectable to an AC mains power supply. The connector 301 is a USB Type-C connector (plug) and removably connectable to the connector 105. With the connector 301 of the external power supply 300 connected to the printer 100, and the connection terminal 302 of the external power supply 300 connected to the AC mains power supply, power from the AC mains power supply is supplied to the printer 100 via the external power supply 300.

As illustrated in FIG. 1B, the printer 100 includes a sheet cover 106 that is supported by a bottom portion of the printer 100 such that it is openable and closable in a direction indicated by an arrow C. With the sheet cover 106 opened, a sheet stacking unit 107 is configured to be loaded with one or more sheets 400 of a predetermined size. The sheets 400 loaded in the sheet stacking unit 107 are conveyed into the printer 100 one by one by a sheet feeding mechanism provided in the printer 100, which will be described later. The sheets 400 are then subjected to printing while being conveyed.

FIGS. 2A and 2B illustrate external perspective views of the ink ribbon cassette 200 to be installed in the printer 100 in FIGS. 1A and 1B. FIG. 2A illustrates an external perspective view of the ink ribbon cassette 200 as viewed from the front (from the top surface side), and FIG. 2B illustrates an external perspective view of the ink ribbon cassette 200 as viewed from the rear (from the bottom surface side). As illustrated in FIGS. 2A and 2B, the ink ribbon cassette 200 includes a hollow casing which is comprised of an upper case 201 on the front side and a first lower case 202 and a second lower case 203 on the rear side and is formed by putting them together. The upper case 201, the first lower case 202, and the second lower case 203 are made of, for example, various resin materials.

Figure 3:
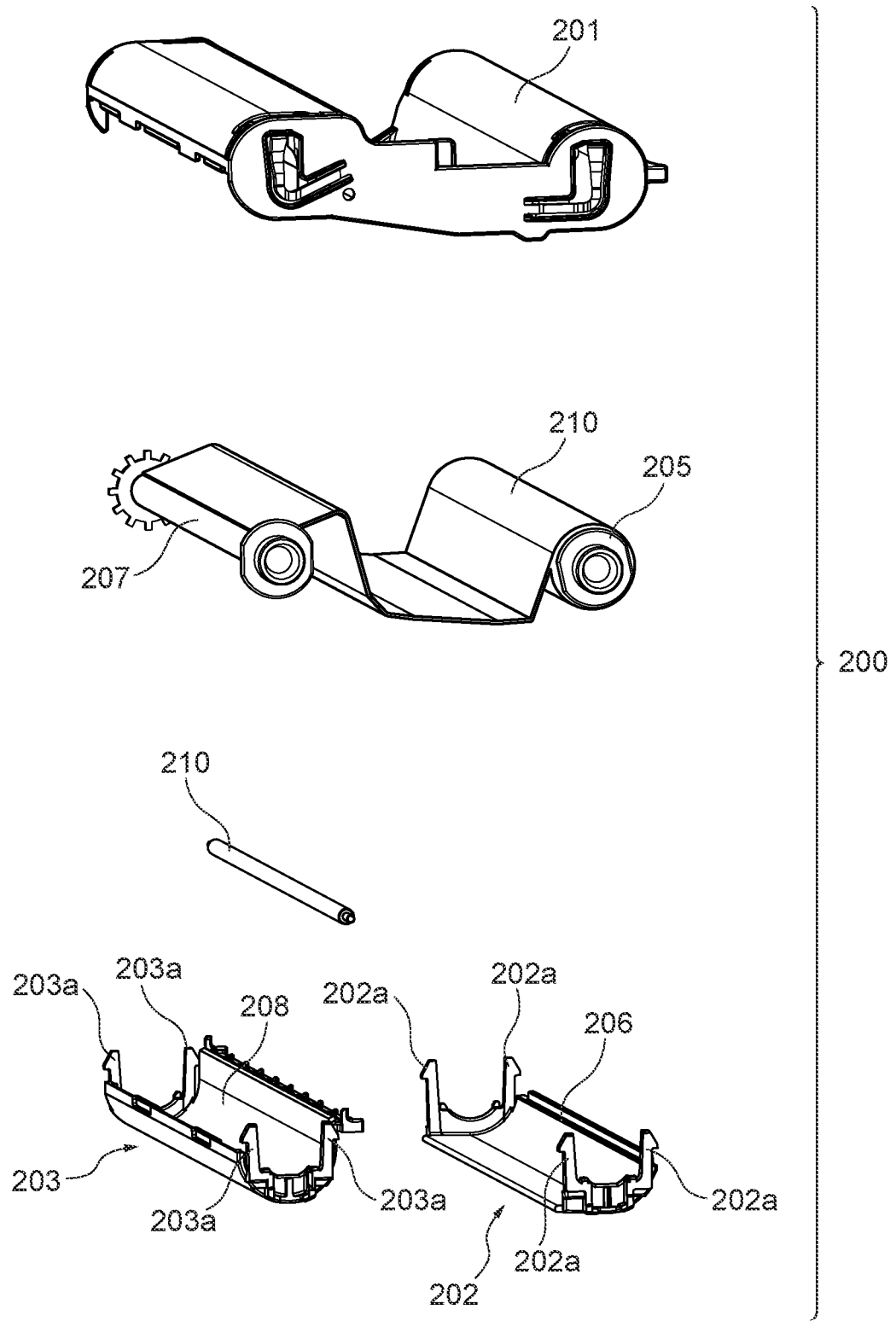
FIG. 3 illustrates an exploded perspective view of the ink ribbon cassette to be installed in the printer in FIGS. 2A and 2B.

FIG. 3 illustrates an exploded perspective view of the ink ribbon cassette 200 to be installed in the printer 100 in FIGS. 2A and 2B. As illustrated in FIG. 3, the ink ribbon cassette 200 includes a feeding bobbin 205, a winding bobbin 207, and an ink ribbon 210. The feeding bobbin 205 and the winding bobbin 207 are members with the same composition and are made of, for example, a resin material. The ink ribbon 210 has one end thereof wound around the feeding bobbin 205 and the other end thereof wound around the winding bobbin 207. The ink ribbon 210 is taken up from the feeding bobbin 205 to the feeding bobbin 205.

The first lower case 202 includes a feeding bobbin housing unit 206 which houses the feeding bobbin 205 rotatably. The first lower case 202 further includes engaging claws 202a which engage with the upper case 201. Pairs of the engaging claws 202a are provided at respective locations on the first lower case 202, corresponding to the ends of the feeding bobbin 205. The first lower case 202 and the upper case 201 are put together by the engaging claws 202a engaging with respective predetermined portions of the upper case 201. The second lower case 203 includes a winding bobbin housing unit 208 which houses the winding bobbin 207 rotatably. The second lower case 203 further includes engaging claws 203a which engage with the upper case 201. Pairs of the engaging claws 203a are provided at respective locations on the second lower case 203, corresponding to the ends of the winding bobbin 207. The second lower case 203 and the upper case 201 are put together by the engaging claws 203a engaging with respective predetermined portions of the upper case 201.

Figure 4:
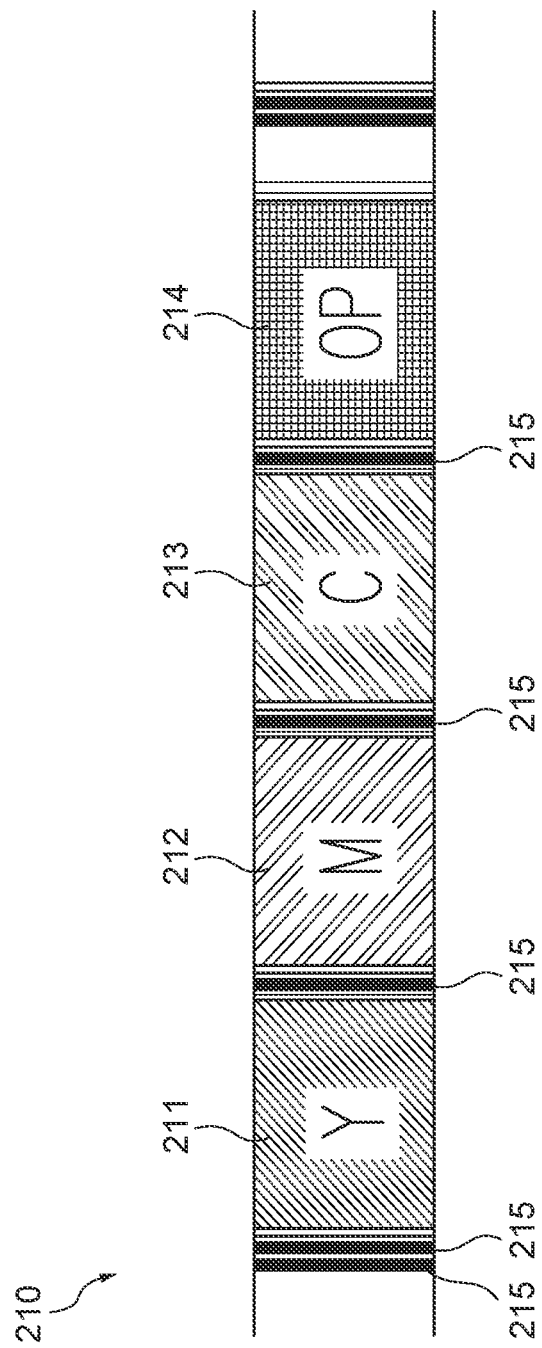
FIG. 4 illustrates an unrolled view of an ink ribbon which the ink ribbon cassette in FIGS. 2A and 2B includes.

FIG. 4 illustrates an unrolled view of the ink ribbon 210 which the ink ribbon cassette 200 in FIGS. 2A and 2B includes. As illustrated in FIG. 4, the ink ribbon 210 includes a plurality of color materials comprised of yellow dye 211, magenta dye 212, cyan dye 213 and an overcoat material 214 which are applied in a layer onto a base material of the ink ribbon 210 in this order in the longitudinal direction of the ink ribbon 210.

At the head positions (or the beginning position) of the respective color materials, strip-shaped markers 215 extending in the width direction of the ink ribbon 210 are formed by application. The markers 215 are black lines. The head position of each color material is detected in response to the corresponding marker 215 blocking light output from an ink ribbon sensor 150, which will be described later. At the head position of the yellow dye 211, two markers 215 are formed side by side in the longitudinal direction of the ink ribbon 210. One marker 215 is formed at each of the head positions of the magenta dye 212, the cyan dye 213, and the overcoat material 214, so that they can be distinguished from the head position of the yellow dye 211.

Figure 5:
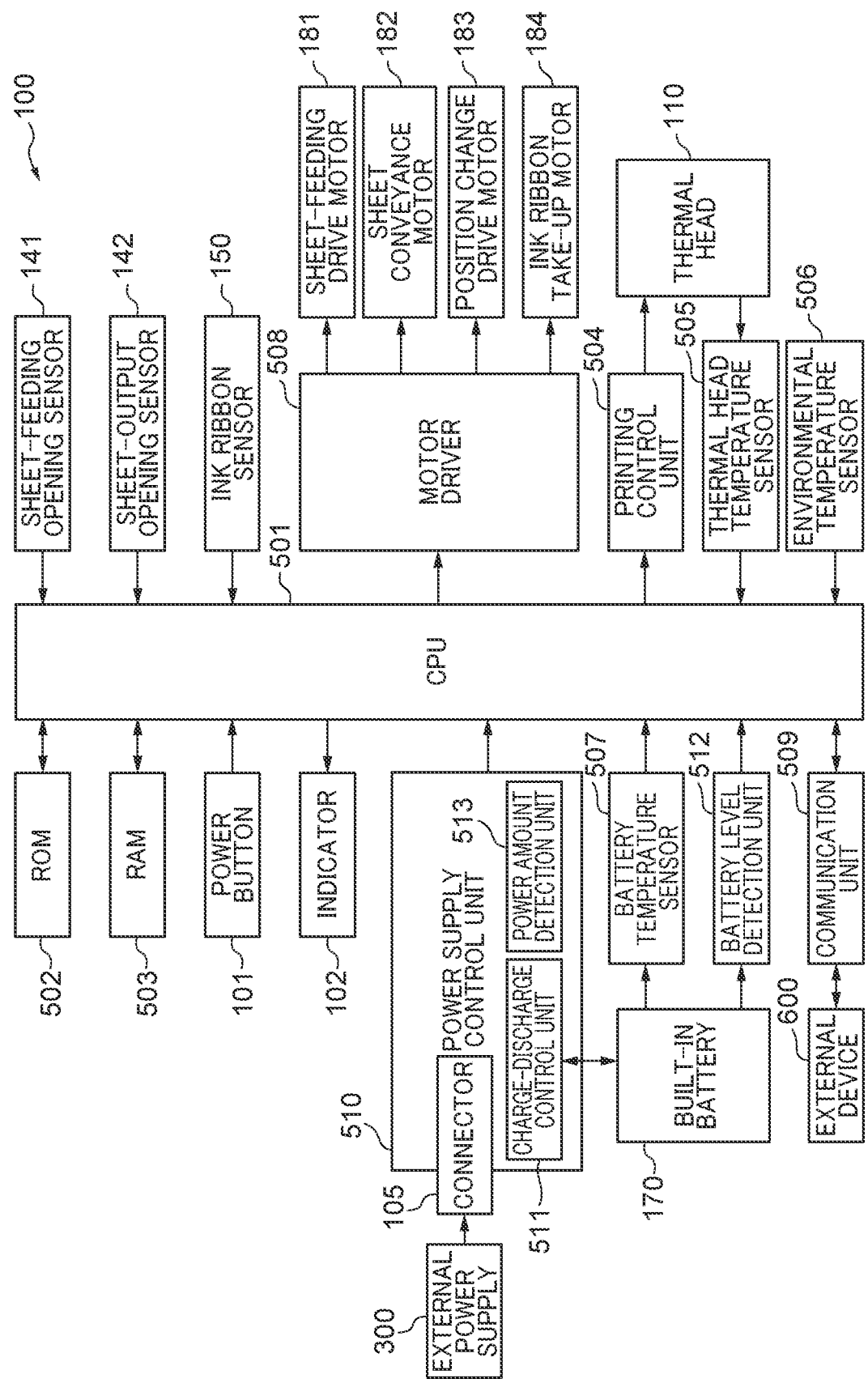
FIG. 5 illustrates a block diagram illustrating an electric configuration of the printer in FIGS. 1A and 1B.

FIG. 5 is a block diagram illustrating an electric configuration of the printer in FIGS. 1A and 1B. Referring to FIG. 5, a description will now be given of a system configuration of the printer 100 according to the present embodiment.

As illustrated in FIG. 5, the printer 100 includes a CPU 501 (control unit) configured to perform system control of the printer 100 and computations, and a ROM 502 that stores system control programs for the printer 100. Loading programs from the ROM 502, the CPU 501 controls operation (execution of a printing apparatus control method) of the components in the printer 100, based on the loaded programs.

The printer 100 further includes a RAM 503, a printing control unit 504, and a thermal head 110. The RAM 503 is used to temporarily store image data for use in data processing. The printing control unit 504 is configured to generate print data based on image data stored in the RAM 503, convert the print data into an electric signal, and output the electric signal to the thermal head 110. The thermal head 110 is configured to convert the electric signal into thermal energy and transfer the dyes on the ink ribbon 210 to a sheet 400.

The printer 100 includes a thermal head temperature sensor 505, an environmental temperature sensor 506, a battery temperature sensor 507 as temperature sensors or temperature obtaining units that obtain information about temperatures. The thermal head temperature sensor 505 is a sensor configured to measure the temperature of the thermal head 110. The environmental temperature sensor 506 is a sensor configured to measure the temperature in the printer 100. The battery temperature sensor 507 is a sensor configured to measure the temperature of the built-in battery 170.

The printer 100 further includes a sheet-feeding opening sensor 141, a sheet-output opening sensor 142, and the ink ribbon sensor 150 as sensors for detecting various types of information. The sheet-feeding opening sensor 141 and the sheet-output opening sensor 142 are sensors configured to detect the position of the sheet 400. The ink ribbon sensor 150 is a sensor configured to detect the markers 215 on the ink ribbon 210.

The printer 100 further includes a sheet-feeding drive motor 181, a sheet conveyance motor 182, a position change motor 183, an ink ribbon take-up motor 184, and a motor driver 508 that controls the operation of these motors. The sheet-feeding drive motor 181 and the sheet conveyance motor 182 are motors configured to convey sheets 400. The position change motor 183 is a motor configured to change the positions of the thermal head 110 and a sheet-feeding roller 130. The ink ribbon take-up motor 184 is a motor configured to take up the ink ribbon 210.

The printer 100 includes a communication unit 509 to which the external device 600 like as a mobile terminal or a personal computer is communicably connectable. The communication unit 509 is configured to control communication with the external device 600.

The printer 100 includes a power supply control unit 510 and a battery level detection unit 512. The power supply control unit 510 includes a power amount detection unit 513 configured to detect the amount of power supplied from the external power supply 300. The power supply control unit 510 is configured to monitor the connector 105 to check whether or not the external power supply 300 is connected to the connector 105. In a case where the external power supply 300 is connected to the connector 105, the power supply control unit 510 causes the power amount detection unit 513 to detect the amount of power supplied from the external power supply 300 and communicates with the external power supply 300 to control the amount of power supplied to the printer 100 from the external power supply 300. It allows the printer 100 to perform various operations with power supplied from the external power supply 300. The power supply control unit 510 further includes a charge-discharge control unit 511. The charge-discharge control unit 511 is configured to perform charge control to charge the built-in battery 170 with power supplied from the external power supply 300 and discharge control to supply the printer 100 with power that has charged the external power supply 300.

The battery level detection unit 512 is a detector for detecting (measuring) the remaining battery level and is configured to detect the remaining battery level of the built-in battery 170 by measuring the terminal voltage of the built-in battery 170.

The system configuration described above allows the printer 100 to have any of a plurality of power modes including a first power mode, a second power mode, and a third power mode described below. The first power mode is so called a battery power mode in which the printer 100 is supplied with power from the built-in battery 170. The second power mode is so called a double power mode in which the printer 100 is supplied with power from both the built-in battery 170 and the external power supply 300. The third power mode is so called an external power mode in which the printer 100 is supplied with power from the external power supply 300. The printer 100 is capable of printing in any of these power modes, i.e., the first power mode, the second power mode, and the third power mode. The printer 100 may be configured to perform printing in the first power mode or the second power mode.

Figure 6A:
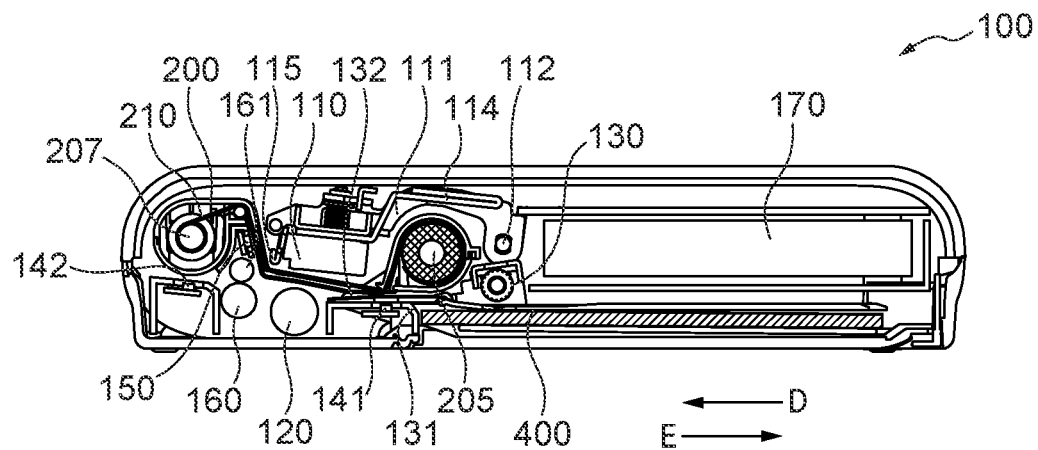
FIGS. 6A, 6B, and 6C illustrate cross-sectional views depicting a printing operation of the printer in FIGS. 1A and 1B step by step.
Figure 6B:
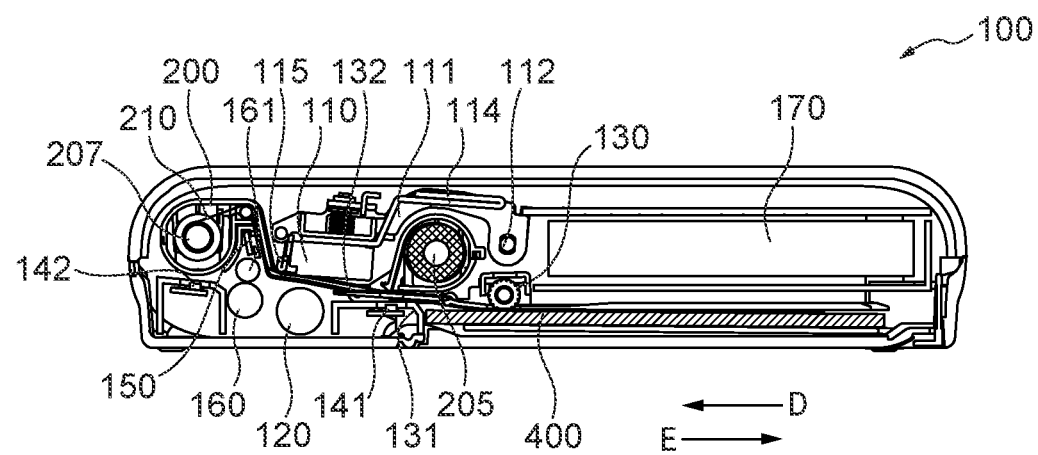
Figure 6C:
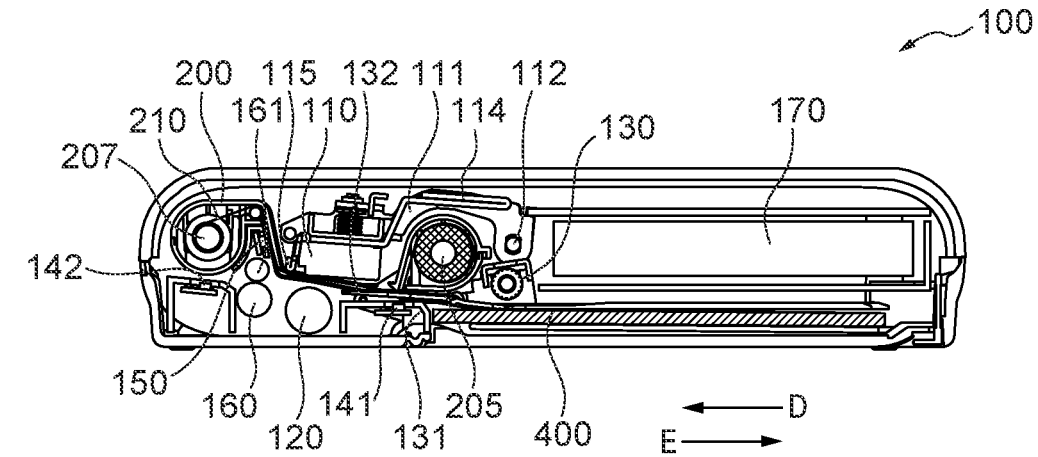
Figure 7A:
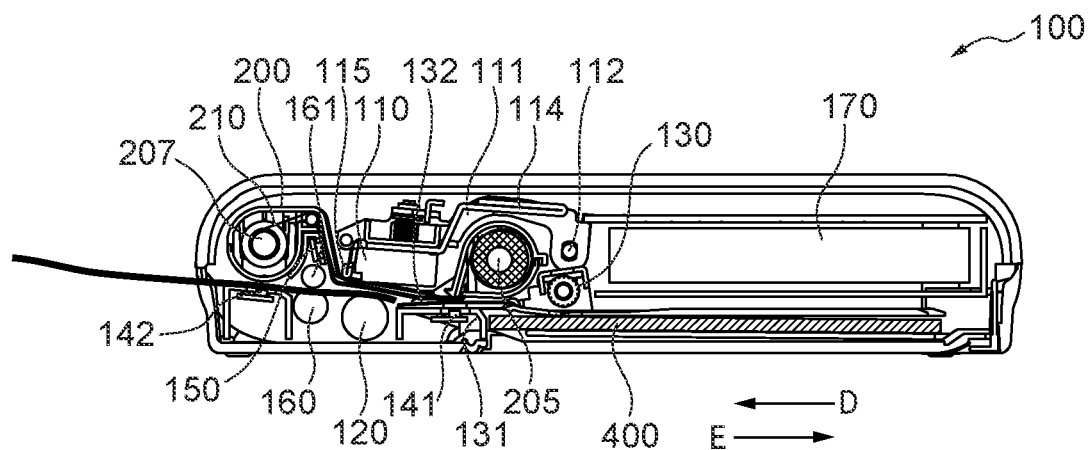
FIGS. 7A, 7B, and 7C illustrate cross-sectional views depicting the printing operation of the printer in FIGS. 1A and 1B step by step.
Figure 7B:
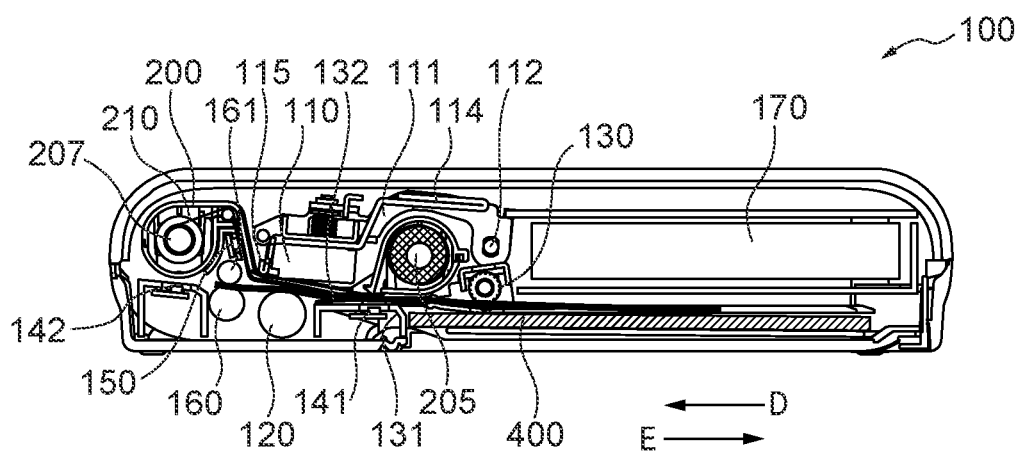
Figure 7C:
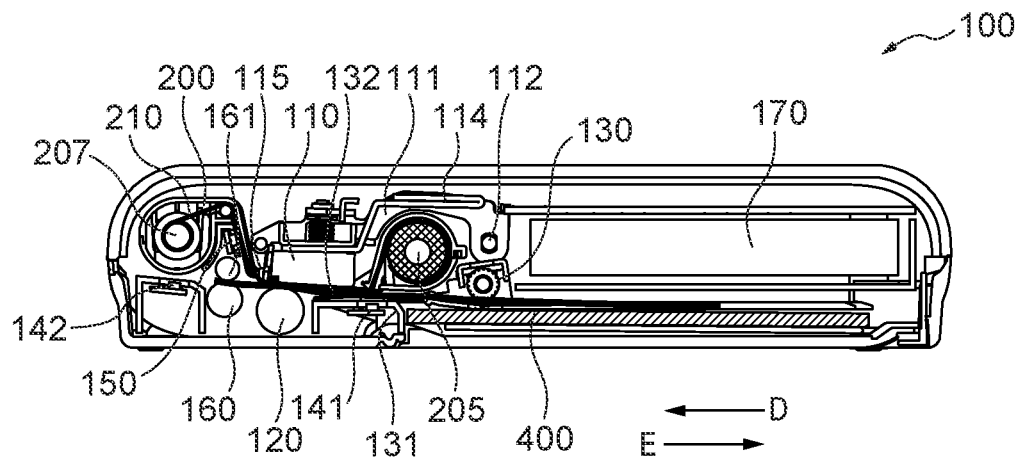
Figure 8:
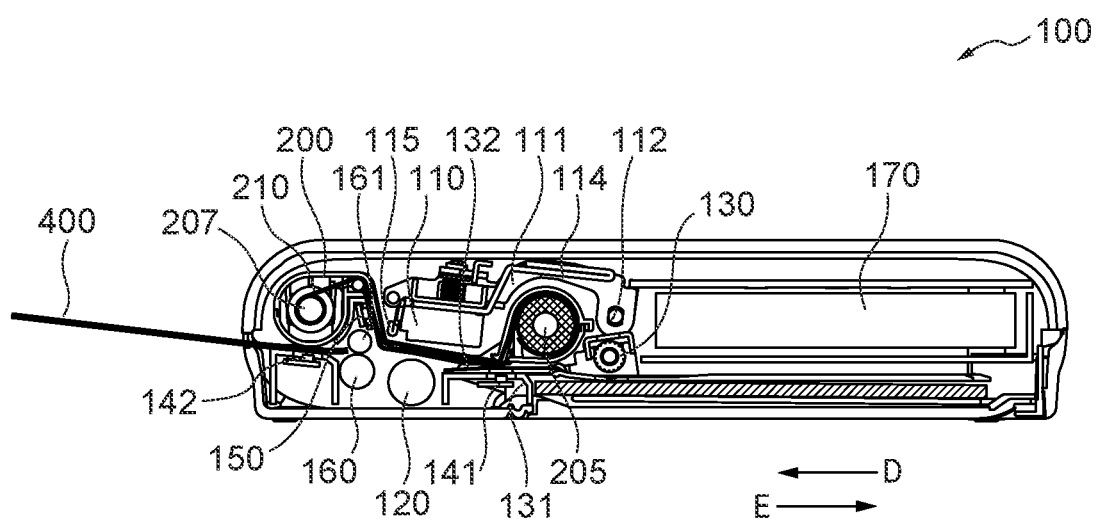
FIG. 8 illustrates a cross-sectional view illustrating the printing operation of the printer in FIGS. 1A and 1B step by step.

FIGS. 6A, 6B, 6C, 7A, 7B, 7C and 8 illustrate cross-sectional views depicting a printing operation of the printer 100 in FIGS. 1A and 1B step by step. FIG. 6A illustrates a cross-sectional view illustrating a standby state of the printer 100, FIG. 6B illustrates a cross-sectional view illustrating a sheet feeding operation, and FIG. 6C illustrates a cross-sectional view illustrating an ink ribbon preparation operation. FIG. 7A illustrates a cross-sectional view illustrating a state after sheet feeding is resumed, FIG. 7B illustrates a cross-sectional view illustrating a state at the start of printing, and FIG. 7C illustrates a cross-sectional view illustrating a state during printing. FIG. 8 illustrates a cross-sectional view illustrating a state after sheet-output.

As illustrated in FIG. 6A to FIG. 8, the printer 100 includes the thermal head 110, a head arm 111, a heat dissipation plate 114, a peeling plate 115, and a platen roller 120. The head arm 111 is supported such that it is pivotable on a head supporting shaft 112. The thermal head 110 is supported by the head arm 111 such that it is pivotable from a standby position indicated in FIG. 6A to a printing position indicated in FIG. 7C and capable of generating contact pressure between the platen roller 120 and itself. In the standby state illustrated in FIG. 6A, the thermal head 110 is urged clockwise about the head supporting shaft 112 by a head urging spring, which is not illustrated. The thermal head 110 is controlled to be positioned at the standby position at which it keeps the maximum longest distance from the platen roller 120 so as not to interfere with the ink ribbon cassette 200 which is being inserted to or removed from (attached to or detached from) the printer 100.

The heat dissipation plate 114, which is attached to the thermal head 110, releases heat generated by a heating element of the thermal head 110. The platen roller 120 is rotatable with conveyance of sheets 400. The peeling plate 115, which is attached to the thermal head 110, peels the ink ribbon 210 from a sheet 400 by turning the ink ribbon 210 about 90 degrees.

The printer 100 includes the sheet-feeding roller 130. The sheet-feeding roller 130 is driven to rotate by the operation of the sheet-feeding drive motor 181. The sheet-feeding roller 130 is movable from a retracted position indicated in FIG. 6A to a sheet-feeding position indicated in FIG. 6B at which the sheet-feeding roller 130 abuts against a sheet 400.

The printer 100 includes a separating plate 131 and a sheet guide 132. When a sheet 400 is fed, the sheet guide 132 is lifted by the sheet 400 and supported such that it is pivotable from a position indicated in FIG. 6A to a position indicated in FIG. 6B. The sheet guide 132 is always urged downward and lies at a position at which it abuts against the separating plate 131 illustrated in FIG. 6A.

The printer 100 includes the sheet-feeding opening sensor 141, the sheet-output opening sensor 142, and the ink ribbon sensor 150. The sheet-feeding opening sensor 141 and the sheet-output opening sensor 142 each includes a light emitting unit and a light receiving unit so that light output from the light emitting unit is reflected on the backside of a sheet 400 and the light receiving unit receives the reflected light. The sheet-feeding opening sensor 141 and the sheet-output opening sensor 142 detect the presence or absence of the sheet 400 according to whether or not light has been received by the light receiving unit. The ink ribbon sensor 150 includes a light emitting unit and a light receiving unit so that light output from the light emitting unit is reflected on a wall of the ink ribbon cassette 200, and the light receiving unit receives the reflected light. The ink ribbon sensor 150 detects the position of the marker 215 when light from the light emitting unit is blocked by the marker 215.

The printer 100 includes a conveyance roller 160 and a driven roller 161. The conveyance roller 160 is driven to rotate by the operation of the sheet conveyance motor 182. The driven roller 161 is disposed to face the conveyance roller 160, which is a drive roller, so as to rotate in a manner following the rotation of the conveyance roller 160. The rotation of the rollers transports sheets 400.

The printer 100 includes the built-in battery 170. The built-in battery 170 is housed in the printer to be located above sheets 400. The built-in battery 170 is a secondary battery like a lithium-ion battery, a NiCad secondary battery, or a nickel hydride secondary battery, and is configured to be charged with power supplied from the external power supply 300.

Figure 9:
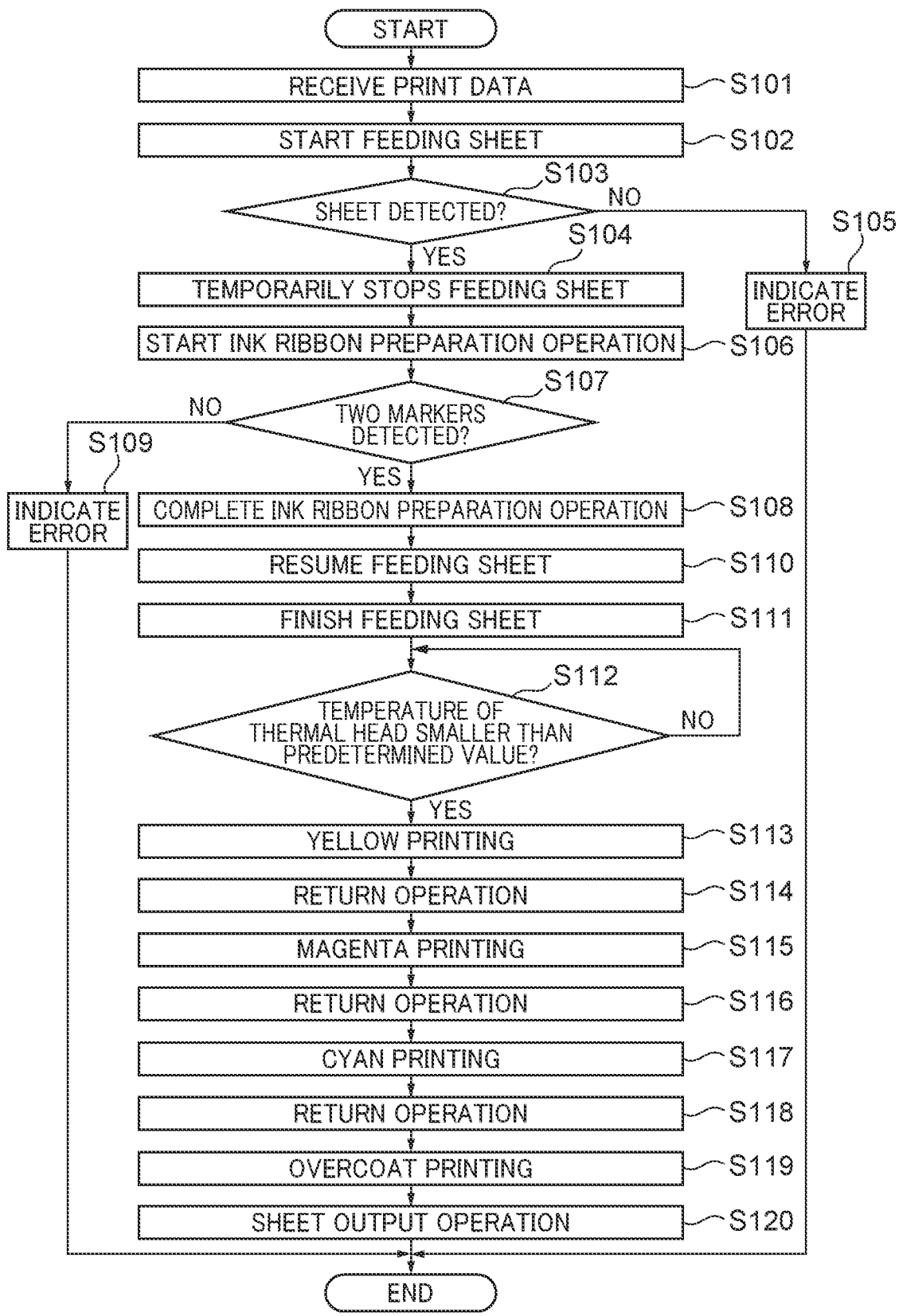
FIG. 9 is a flowchart illustrating the printing operation of the printer in FIGS. 1A and 1B.

Referring to FIG. 6A to FIG. 9, a description will be given of a printing operation (color printing) of the printer 100. FIG. 9 is a flowchart illustrating the printing operation of the printer 100 in FIGS. 1A and 1B. When the ink ribbon cassette 200 and sheets 400 are loaded in the printer 100, and the power is turned on by operating the power button 101, the printer 100 goes into a standby state. As a result, the printing operation of the printer according to the flowchart of FIG. 9 is started. Processes (steps) in the flowchart of FIG. 9 are implemented by the CPU 501 loading a program from the ROM 502 and controlling the operation of the components in the printer 100 based on the loaded program.

In step S101, when the transmission of print data from the external device 600 to the printer 100 is started, the printer 100 (the CPU 501) receives the print data via the communication unit 509. At this time, in accordance with an instruction from the CPU 501, the indicator 102 starts blinking to indicate a reading state in which the print data is being read. Then, when the reception of the print data is completed, and the indicator 102 that has blinked starts to light up, the process proceeds to step S102.

In the step S102, the thermal head 110 is caused to pivot counterclockwise as viewed in FIGS. 6A, 6B, and 6C about the heat supporting shaft 112 by the operation of the position change motor 183. As a result, the thermal head 110 moves from the standby position indicated in FIG. 6A to an intermediate position indicated in FIG. 6B. At this time, the sheet-feeding roller 130 is pushed down from the retracted position indicated in FIG. 6A to a sheet-feeding position indicated in FIG. 6B and abuts against a sheet 400. The sheet-feeding roller 130 is also rotated clockwise as viewed in FIGS. 6A, 6B, and 6C by the operation of the sheet-feeding drive motor 181. Thus, the sheet 400 stored in the sheet stacking unit 107 is conveyed toward the interior of the printer 100. During the conveyance, the sheet 400 abuts against the separating plate 131 in the printer 100, and the leading end of the sheet 400 pushes up the sheet guide 132. Thus, only one sheet 400 stacked at the top in the sheet stacking unit 107 is conveyed.

In step S103, the CPU 501 determines whether or not the sheet 400 has been detected by the sheet-feeding opening sensor 141. When it is determined in the step S103 that the sheet 400 has been detected, the process proceeds to step S104. On the other hand, when it is determined in the step S103 that the sheet 400 has not been detected within a predetermined time period, the process proceeds to step S105. Examples of the state in which it is determined that the sheet 400 has not been detected includes a state in which no sheet 400 is loaded in the sheet stacking unit 107.

In the step S104, the sheet-feeding roller 130 stops rotating. At this time, the sheet-feeding roller 130 is pushed up from the sheet-feeding position indicated in FIG. 6B to a retracted position indicated in FIG. 6C and temporarily stops the sheet feeding operation. As described earlier, the sheet guide 132 is always urged downward. Thus, the sheet 400 is stably held in a state of being sandwiched between the separating plate 131 and the sheet guide 132 at a position indicated in FIG. 6C.

In the step S105 after the execution of the step S103, the sheet-feeding roller 130 stops rotating as well. At this time, the sheet-feeding roller 130 is pushed up from the sheet-feeding position indicated in FIG. 6B to the retracted position indicated in FIG. 6A and stops the sheet feeding operation. Then, the thermal head 110 is caused to pivot counterclockwise as viewed in the illustrations provided in FIGS. 6A, 6B, and 6C about the heat supporting shaft 112 by the operation of the position change motor 183. As a result, the thermal head 110 moves from the intermediate position indicated in FIG. 6B to the standby position indicated in FIG. 6A. At this time, the CPU 501 blinks the indicator 102 and ends the process. By blinking the indicator 102, the printer 100 provides notification of an error indicating that a sheet 400 could not be fed. The external device 600 may also provide notification indicating the same error.

In step S106, the CPU 501 issues an instruction to the motor driver 508, which starts a preparation operation for the yellow dye 211 on the ink ribbon 210. In this preparation operation, the winding bobbin 207 in the ink ribbon cassette 200 engages with a predetermined engaging portion of the printer 100 and is rotated counterclockwise as viewed in FIGS. 6A, 6B, and 6C about the heat supporting shaft 112 by the operation of the ink ribbon take-up motor 184. As a result, the ink ribbon 210 wound around the feeding bobbin 205 is taken up by the winding bobbin 207. As illustrated in FIG. 4, the markers 215 are provided at the leading ends of the respective colors on the ink ribbon 210, and in particular, the two markers 215 are provided at the leading end of the yellow dye 211. As described earlier, the printer 100 includes the ink ribbon sensor 150, which is a reflective optical sensor. When one of the markers 215 provided on the ink ribbon 210 is blocked by light, the ink ribbon sensor 150 detects the marker 215. When the two markers 215 are sequentially detected by the ink ribbon sensor 150 within a predetermined time period, the head position of the yellow dye 211 is determined.

In step S107, the CPU 501 determines whether or not the ink ribbon sensor 150 has detected the two markers 215 at the leading end of the yellow dye 211. When it is determined in the step S107 that the two markers 215 have been detected, the process proceeds to step S108. On the other hand, when it is determined in the step S107 that the two markers 215 have not been detected, the process proceeds to step S109. Examples of the state in which it is determined that the two markers 215 have not been detected includes a state in which there is no ink ribbon 210 remaining inside the ink ribbon cassette 200 loaded in the printer 100.

In the step S108, the preparation operation for the yellow dye 211 is completed.

In the step S109, the CPU 501 blinks the indicator 102 and ends the process. By blinking the indicator 102, the printer 100 provides notification of an error indicating that there is no ink ribbon 210 remaining inside the ink ribbon cassette 200. The external device 600 may also provide notification indicating the same error.

In step S110, the sheet-feeding roller 130 is pushed down from the retracted position indicated in FIG. 6C to the sheet-feeding position indicated in FIG. 6B by the operation of the position change motor 183 and abuts against the sheet 400. In this state, the sheet-feeding roller 130 is rotated clockwise as viewed in FIGS. 6A, 6B, and 6C by the operation of the sheet-feeding drive motor 181 and resumes the sheet feeding operation. Thus, the sheet 400 is conveyed in a direction indicated by an arrow D. The conveyance roller 160 is also rotated counterclockwise as viewed in the illustrations provided in FIGS. 6A, 6B, and 6C by the operation of the sheet conveyance motor 182 at the same speed as the rotational speed of the sheet-feeding roller 130. Thus, the sheet 400 enters into a nip position between the conveyance roller 160 and the driven roller 161 at no load and is further conveyed in the direction indicated by the arrow D. When the sheet 400 has been nipped between the conveyance roller 160 and the driven roller 161 and conveyed in the direction indicated by the arrow D, the sheet-feeding roller 130 stops rotating.

After that, the sheet-feeding roller 130 is pushed up to a retracted position indicated in FIG. 7A by the operation of the position change motor 183. When the sheet 400 has been further conveyed to a position indicated in FIG. 7A, the sheet guide 132 is pushed down from a position indicated in FIG. 6C to a position indicated in FIG. 7A.

Then, after stopping to rotate, the conveyance roller 160 is rotated clockwise as viewed in the illustrations provided in FIGS. 7A, 7B, and 7C by the operation of the sheet-conveying drive motor 182. Thus, the sheet 400 is conveyed in a direction indicated by an arrow E. Moreover, since the sheet guide 132 has been pushed down to the position indicated in FIG. 7A, the sheet 400 is conveyed toward an upward conveying path. The leading end of the sheet 400 in the conveying direction is detected by the sheet-feeding opening sensor 141 and then conveyed by a predetermined distance, so that the conveyance of the sheet 400 is stopped at a printing start position indicated in FIG. 7B. In step S111, the sheet feeding operation is completed.

In the step S112, the CPU 501 causes the thermal head temperature sensor 505 to measure the temperature of the thermal head 110 and determines whether or not the temperature of the thermal head 110 is lower than a predetermined temperature. In the present embodiment, it is assumed that the predetermined temperature of the thermal head 110 is 60° C., for example. When it is determined in the step S112 that the temperature of the thermal head 110 is lower than the predetermined temperature, the process proceeds to step S113. On the other hand, when it is determined in the step S112 that the temperature of the thermal head 110 is not lower than the predetermined temperature, that is, the temperature of the thermal head 110 is equal to or higher than the predetermined temperature, the CPU 501 stands by.

When the temperature of the thermal head 110 is equal to or higher than the predetermined temperature, it is feared that more heat than necessary will be applied to the ink ribbon 210, and desired printing will not be performed. For this reason, the CPU 501 temporarily stops printing and stands by until the temperature of the thermal head 110 becomes lower than the predetermined temperature. At this time, the printer 100 can reduce power consumption, and hence the built-in battery 170 can be charged with power from the external power supply 300.

In step S113, the printer 100 performs yellow printing. The CPU 501 causes the position change motor 183 to pivot the head arm 111, causing the thermal head 110 to rest at a printing position indicated in FIG. 7C. As a result, the thermal head 110 and the platen roller 120 bring the sheet 400 and the ink ribbon 210 into contact with each other by pressurizing them.

After that, the heating element of the thermal head 110 is heated by a print signal supplied from the printing control unit 504 while the sheet 400 is conveyed in the direction indicated by the arrow D. As a result, the yellow dye 211 on the ink ribbon 210 is thermally transferred to the sheet 400 to perform yellow printing. During printing, the winding bobbin 207 is rotated by the operation of the ink ribbon take-up motor 184. Thus, the ink ribbon 210 is conveyed in the position change motor 183 at the same conveying speed at which the sheet 400 is conveyed.

The process then proceeds to step S114. In the step S114, the printer 100 performs a return operation. In the return operation, first, the head arm 111 pivots to cause the thermal head 110 and the platen roller 120 to stop the pressurization and rests at an intermediate position indicated in FIG. 7A. Then, the conveyance roller 160 conveys the sheet 400 in a direction indicated by an arrow E up to a printing start position indicated in FIG. 7B. At the same time, the winding bobbin 207 is rotated by the operation of the ink ribbon take-up motor 184. Then, when the ink ribbon sensor 150 detects the marker 215 provided at the leading end of the magenta dye 212, the winding bobbin 207 stops rotating. At this time, the preparation operation for the magenta dye 212 is completed.

In step S115, the printer 100 performs magenta printing. In magenta printing, as with yellow printing described above, the CPU 501 causes the position change motor 183 to pivot the head arm 111, causing the thermal head 110 to rest at the position indicated in FIG. 7C. As a result, the sheet 400 and the ink ribbon 210 are be collectively pressed between the thermal head 110 and the platen roller 120.

After that, the heating element of the thermal head 110 is heated by a print signal supplied from the printing control unit 504 while the sheet 400 is conveyed in the direction indicated by the arrow D. As a result, the magenta dye 212 on the ink ribbon 210 is thermally transferred to the sheet 400 to perform magenta printing.

In step S116, the printer 100 performs a return operation as with the step S114. In the return operation, first, the head arm 111 pivots to cause the thermal head 110 and the platen roller 120 to stop the pressurization and rests at the intermediate position indicated in FIG. 7A. Then, the conveyance roller 160 conveys the sheet 400 in the direction indicated by the arrow E up to the printing start position indicated in FIG. 7B. At the same time, the winding bobbin 207 is rotated by the operation of the ink ribbon take-up motor 184. Then, when the ink ribbon sensor 150 detects the marker 215 provided at the leading end of the cyan dye 213, the winding bobbin 207 stops rotating. At this time, the preparation operation for the cyan dye 213 is completed.

In step S117, the printer 100 performs cyan printing. In cyan printing, as with yellow printing described above, the CPU 501 causes the position change motor 183 to pivot the head arm 111, causing the thermal head 110 to rest at the position indicated in FIG. 7C. As a result, the sheet 400 and the ink ribbon 210 are collectively pressed between the thermal head 110 and the platen roller 120.

After that, the heating element of the thermal head 110 is heated by a print signal supplied from the printing control unit 504 while the sheet 400 is conveyed in the direction indicated by the arrow D. As a result, the cyan dye 213 on the ink ribbon 210 is thermally transferred to the sheet 400 to perform cyan printing.

In the present embodiment, overcoat printing is performed so as to prevent an image printed on the sheet 400 from being degraded due to external factors after three-color printing.

In step S118, the printer 100 performs a return operation as with the step S114. In the return operation, first, the head arm 111 pivots to cause the thermal head 110 and the platen roller 120 to stop the pressurization and rests at the intermediate position indicated in FIG. 7A. Then, the conveyance roller 160 conveys the sheet 400 in the direction indicated by the arrow E up to the printing start position indicated in FIG. 7B. At the same time, the winding bobbin 207 is rotated by the operation of the ink ribbon take-up motor 184. Then, when the ink ribbon sensor 150 detects the marker 215 provided at the leading end of the overcoat material 214, the winding bobbin 207 stops rotating. At this time, the preparation operation for the overcoat material 214 is completed.

In step S119, the printer 100 performs overcoat printing. In overcoat printing, as with yellow printing described above, the CPU 501 causes the position change motor 183 to pivot the head arm 111, causing the thermal head 110 to rest at the position indicated in FIG. 7C. As a result, the sheet 400 and the ink ribbon 210 are be collectively pressed between the thermal head 110 and the platen roller 120.

After that, the heating element of the thermal head 110 is heated according to a print signal supplied from the printing control unit 504 while the sheet 400 is conveyed in the direction indicated by the arrow D. As a result, the overcoat material 214 on the ink ribbon 210 is thermally transferred to the sheet 400 to perform overcoat printing.

In step S120, the printer 100 performs a sheet-output operation in which it outputs the sheet 400. In the sheet-output operation, the CPU 501 issues an instruction to the motor driver 508, which in turn rotates the conveyance roller 160 counterclockwise as viewed in FIG. 8 to convey the sheet 400 to a position indicated in FIG. 8, which is away from the nip position between the conveyance roller 160 and the driven roller 161. The CPU 501 also causes the position change motor 183 to pivot the head arm 111, causing the thermal head 110 to a standby position indicated in FIG. 8.

At this time, when the sheet 400 is detected by the sheet-output opening sensor 142, the CPU 501 lights up the indicator 102. By lighting up the indicator 102, the printer 100 provides notification that the printed sheet 400 will be removed. The external device 600 may also provide the same notification. When a user has removed the printed sheet 400, the removal of the sheet 400 is detected by the sheet-output opening sensor 142, and the printing operation is ended.

Figure 10:
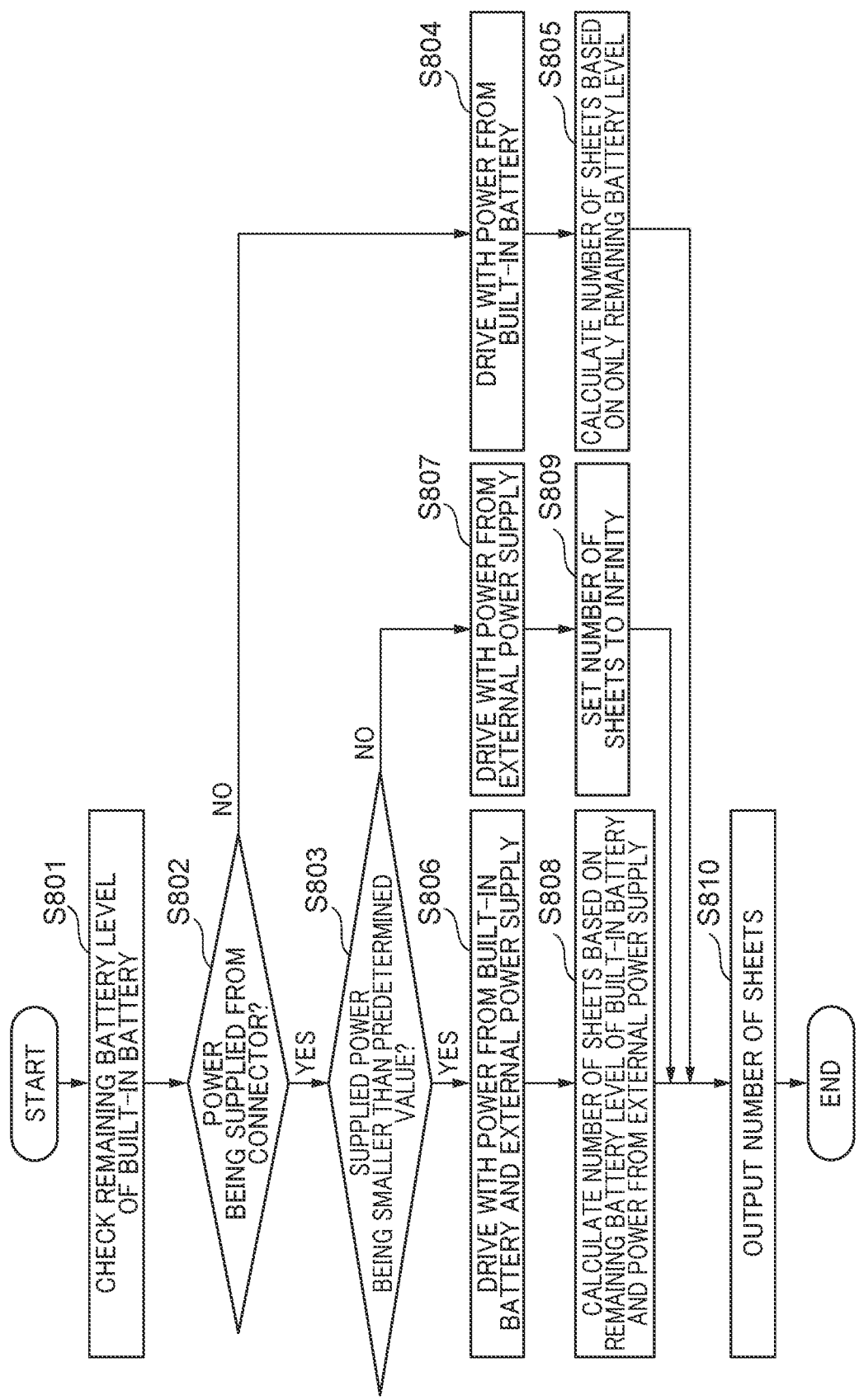
FIG. 10 is a flowchart illustrating a process of determining the number of sheets that the printer in FIGS. 1A and 1B can print.
Figure 11:
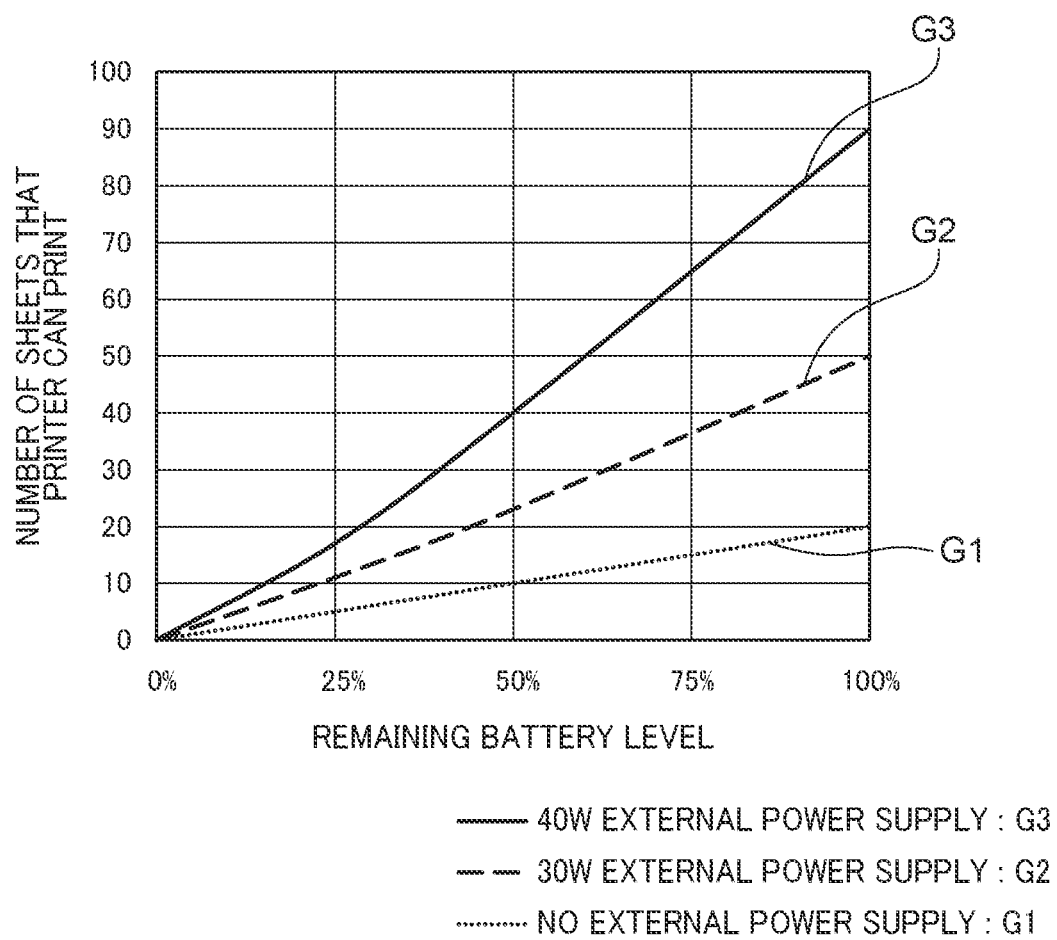
FIG. 11 is a graph of calibration curves indicating the relationship among the remaining battery level, the amount of power from an external power supply, and the number of sheets that the printer can print.

As described earlier, the printer 100 can be in the first power mode in which the printer 100 is supplied with power from the built-in battery 170, the second power mode in which the printer 100 is supplied with power from both the built-in battery 170 and the external power supply 300, and the third power mode in which the printer 100 is supplied with power from the external power supply 300. The printer 100 is able to perform printing in any of the first power mode, the second power mode, and the third power mode. The printer 100 is configured to detect or determine the number of sheets that the printer 100 can print in any of the first to third power modes. The configuration and operation thereof will now be described with reference to FIG. 10 and FIG. 11. FIG. 10 is a flowchart illustrating a process of determining the number of sheets that the printer in FIGS. 1A and 1B can print. FIG. 11 is a graph of calibration curves indicating relationship among the remaining battery level, the amount of power from an external power supply, and the number of sheets that the printer 100 can print. When the power button 101 is operated and the printer 100 is turned on, the printer 100 starts an operation of determining the number of sheets that the printer 100 can print according to the flowchart of FIG. 10. Processes (steps) in the flowchart of FIG. 10 are implemented by the CPU 501 loading a program from the ROM 502 and controlling the operation of the components in the printer 100 based on the loaded program. During the execution of this program, the graph in FIG. 11 is read out and used to determine the number of sheets that the printer 100 can print (the number of sheets to be printed). It should be noted that information on the graph illustrated in FIG. 11 is stored in advance in the ROM 502.

In step S801, the power supply control unit 510 causes the battery level detection unit 512 to measure the terminal voltage of the built-in battery 170, and based on the measured terminal voltage, detects the remaining battery level of the built-in battery 170.

In step S802, the power supply control unit 510 determines whether or not the external power supply 300 is connected to the connector 105 and power from the external power supply 300 is being supplied to the printer 100. When it is determined in the step S802 that the power is being supplied to the printer 100, the process proceeds to step S803. On the other hand, when it is determined in the step S802 that the power is not being supplied to the printer 100, the process proceeds to step S804.

In the step S804, the CPU 501 performs driving control for printing using only the power that has charged in the built-in battery 170, that is, in the first power mode, and the process proceeds to step S805.

In the step S805, based on the remaining battery level of the built-in battery 170 detected in the step S801, the CPU 501 calculates the number of sheets that the printer 100 can print. The graph in FIG. 11 is used for the calculation.

A description will now be given of the graphs in FIG. 11. As illustrated in FIG. 11, the graph includes a curve G1 of a dotted line, a curve G2 of a broken line, and a curve G3 of a solid line. The curve G1 is used to perform driving control for printing using only the power that has charged in the built-in battery 170 without using the power from the external power supply 300. Namely, the curve G1 corresponds to a calibration curve indicating the relationship between the remaining battery level and the number of sheets that the printer 100 can print. The curve G2 is used to perform driving control for printing using the power from both the external power supply 300 and the built-in battery 170. In the curve G2, the power from the external power supply 300 is 30 W. The curve G3 is used to perform driving control for printing using the power from both the external power supply 300 and the built-in battery 170. In the curve G3, the power from the external power supply 300 is 40 W. Namely, the curves G2 and G3 correspond to calibration curves indicating the relationship between the remaining battery level and the number of sheets that can be printed.

Then, in step S805, the CPU 501 uses the curve G1 to calculate the number of sheets that the printer 100 can print. As indicated by the curve G1, when the built-in battery 170 is fully charged, that is, the remaining battery level is 100%, the printer 100 is able to print 20 sheets. When the remaining battery level is 50%, the printer 100 is able to print 10 sheets, and when the remaining battery level is 25%, the printer 100 is able to print 5 sheets. Thus, the number of sheets that the printer 100 can print and the remaining battery level are proportional to each other. The number of sheets that the printer 100 can print corresponding to the remaining battery level is obtained from the curve G1.

As described above, in the present embodiment, the CPU 501 functions as a calculation unit that calculates the number of sheets that the printer 100 can print. When printing is to be performed in the first power mode, the CPU 501 uses the curve G1 to calculate the number of sheets that the printer 100 can print in the printing, based on the remaining battery level. Thus, the number of sheets that the printer 100 can print in the first power mode is correctly determined. After the step S805 is executed, the process proceeds to step S810.

In the step S803 after the execution of the step S802, the power supply control unit 510 determines whether or not the power supplied from the external power supply 300 is smaller than a predetermined value. According to the result of the determination in the step S803 (that is, according to the amount of power from the external power supply 300), the power supply control unit 510 brings the printer 100 into the second power mode or the third power mode. In the present embodiment, the maximum power consumption of the printer 100 is, for example, 60 W. In this case, in the step S803, the power supply control unit 510 determines whether or not the power supplied from the external power supply 300 is smaller than 60 W.

When it is determined in the step S803 that the power is smaller than 60 W, the process proceeds to step S806. When it is determined in the step S803 that the power is not smaller than 60 W, that is, the power is equal to or greater than 60 W, the process proceeds to step S807. In the present embodiment, the power supply control unit 510 causes the power amount detection unit 513 to detect the amount of power supplied from the external power supply 300.

In the step S806, the CPU 501 performs driving control for printing, but this driving control is difficult with only the power supplied from the external power supply 300 since the power supplied from the external power supply 300 is smaller than the maximum power consumption (60 W) of the printer 100. Accordingly, a shortage of the power required for this driving control is made up for by the power that has charged in the built-in battery 170. As a result, even when the amount of power supplied from the external power supply 300 is smaller than the predetermined value, the CPU 501 is able to perform driving control for printing using the power supplied from the external power supply 300 and the power that has charged in the built-in battery 170, that is, in the second power mode. After the step S806 is executed, the process proceeds to step S808.

In the step S808, based on the remaining battery level detected in the step S801 and the power (the amount of power) supplied from the external power supply 300, the CPU 501 calculates the number of sheets that the printer 100 can print. The curve G2 or the curve G3 in FIG. 11 is used for this calculation. In the second power mode, the power supplied from the built-in battery 170 is smaller than in the first power mode. When the power supplied from the external power supply 300 is 30 W, the power consumed from the built-in battery 170 is half of that in the step S805. For this reason, as indicated by the curve G2, when the remaining battery level of the built-in battery 170 is 25%, the number of sheets that the printer 100 can print is 10 sheets, which is twice as many as the number of sheets that can be printed in the first power mode (the curve G1). When the remaining battery level is 50%, the number of sheets that the printer 100 can print is 23, and when the remaining battery level is 100%, the number of sheets the printer 100 can print is 50. In either case, the number of sheets that the printer 100 can print is more than twice as many as the number of sheets that the printer 100 can print in the first power mode (the curve G1). Therefore, in the state where the external power supply 300 is connected, the remaining battery level and the number of sheets that can be printed are not proportional to each other. After the step S808 is executed, the process proceeds to the step S810. Although in the above description of the present embodiment, the cases where the amount of power supplied from the external power supply 300 is 30 W and 40 W are taken as examples, the amount of power supplied from the external power supply 300 is not limited to 30 W or 40 W.

If the printer 100 has continuously printed a plurality of sheets 400, it is feared that the temperature of the thermal head 110 will rise to high depending on the number of printed sheets, and desired printing will be difficult as described earlier. For this reason, when it is detected that the temperature of the thermal head 110 has become equal to or higher than a predetermined value, the printer 100 stops the printing operation and stands by until the temperature of the thermal head 110 becomes lower than the predetermined value. During this period, since the printer 100 temporarily suspends the printing operation, power consumption is minimized, and the built-in battery 170 can be charged with the power supplied from the external power supply 300.

It is preferred that the number of sheets that the printer 100 can print is corrected according to a charging operation in this print standby state. Therefore, the remaining battery level and the number of sheets that the printer 100 can print are not proportional to each other. When the power supplied from the external power supply 300 is 40 W, the power consumed from the built-in battery 170 is 20 W, and hence three times or more as many sheets as the number of sheets that the printer 100 can print in the first power mode can be printed. Thus, based on the temperature of the thermal head 110, the CPU 501 is able to correct the number of sheets that the printer 100 can print. As a result, the number of sheets that the printer 100 can print can be more correctly obtained. It should be noted that temperature information for use in the correction is not limited to the temperature of the thermal head 110, but may be, for example, the temperature in the printer 100 or the temperature of the built-in battery 170.

In the step S807 after the execution of the step S803, since the power supplied from the external power supply 300 is greater than the maximum power consumption of the printer 100, the CPU 501 performs driving control for printing with only the power supplied from the external power supply 300, that is, in the third power mode. Thus, when the power supplied from the external power supply 300 is greater than a predetermined value, the CPU 501 is able to perform driving control for printing in the third power mode. During this driving control for printing in the third power mode, the power supply control unit 510 operates the charge-discharge control unit 511 to charge the built-in battery 170, which is a secondary battery, with the power supplied from the external power supply 300. As a result, for example, the power supplied from the external power supply 300 can be used without waste. After the step S807 is executed, the process proceeds to step S809.

In the step S809, the CPU 501 determines the number of sheets that the printer 100 can print. In the third power mode, the consumption of power from the built-in battery 170 is reduced since driving control for printing can be satisfactorily performed with only the power supplied from the external power supply 300. Thus, when the amount of power supplied from the external power supply 300 is sufficient, the number of sheets that the printer 100 can print is determined to be infinite since the number of sheets that the printer 100 can print does not depend on the remaining battery level of the built-in battery 170. The CPU 501 may also calculate the number of sheets that can be printed by the printer 100 based on the amount of power supplied from the external power supply 300. After the step S809 is executed, the process proceeds to the step S810.

In the step S810, the CPU 501 outputs the number of sheets that the printer 100 can print obtained in the step S805, S808, or S809 to the external device 600 via the communication unit 509 and ends the process. Thus, in the present embodiment, the CPU 501 performs control causing the external device 600 to display the number of sheets that the printer 100 can print, that is, outputs the number of sheets that can be printed. The external device 600 displays the number of sheets that the printer 100 can print received from the printer 100.

It should be noted that although the printer 100 (the CPU 501) uses the graph in FIG. 11 as the calibration curves indicating the relationship between the remaining battery level and the number of sheets that the printer 100 can print and the relationship between the power from the external power supply 300 and the number of sheets that the printer 100 can print, any information can be used as long as it indicates the above relationships. For example, the printer 100 (the CPU 501) may use a table indicating the above relationships to calculate the number of sheets that the printer 100 can print.

A description will now be given of examples in which the number of sheets that the printer 100 can print and others are displayed on the external device 600 with reference to FIGS. 12A, 12B, and 12C. FIGS. 12A, 12B, and 12C illustrate external views of the external device 600 according to the present embodiment. As described earlier, the printer 100 is communicably connected to the external device 600 via the communication unit 509. Installing dedicated application software in the external device 600 enables the external device 600 to communicate with the printer 100 and operate the printer 100.

Figure 13:
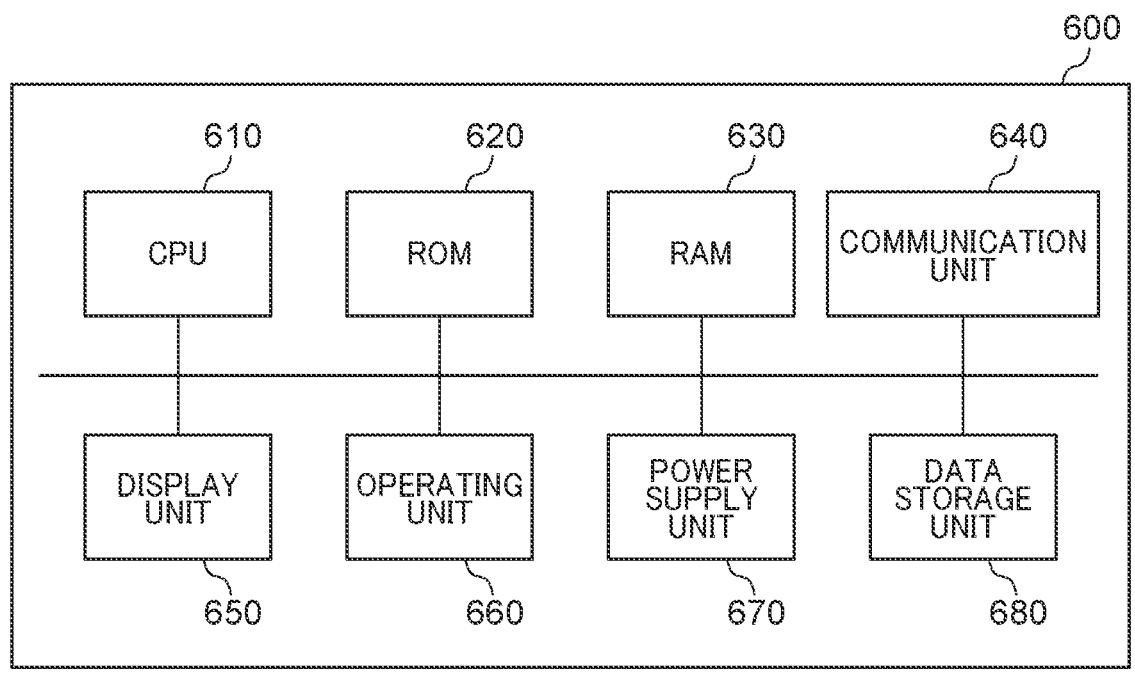
FIG. 13 is a block diagram illustrating an appearance of the external device.

A description will now be given of a configuration of the external device 600 with reference to FIG. 13. FIG. 13 is a block diagram illustrating an appearance of the external device 600. The external device 600 includes a CPU 610 configured to perform system control of the external device 600 and computations, and a ROM 620 that stores system control programs for the external device 600. Loading programs from the ROM 620, the CPU 610 controls operation (e.g., display control) of the components in the external device 600, and based on the loaded programs. A RAM 630 is used to temporarily store various types of data for use in data processing.

The external device 600 includes a communication unit 640 that communicably connects to the printer 100 so as to control communication with the printer 100. The external device 600 further includes a display unit 650, an operating unit 660, a power supply unit 670, and a data storage unit 680. The display unit 650 is configured to display various types of information such as information obtained from the printer 100 via the communication unit 640 and image data stored in the data storage unit 680. The operating unit 660 is comprised of buttons for receiving operational inputs from a user, a touch panel provided integrally with the display unit 650, and so forth. Upon detecting a user's operation on the buttons or the touch panel, the CPU 610 carries out a process according to the user's operation. The data storage unit 680 is a storage unit in which files such as an image data file are recorded.

The external device 600 is capable of displaying information (the number of sheets that the printer 100 can print) obtained from the printer 100 via the communication unit 640 on the display unit 650. The external device 600 is also capable of displaying image data stored in the data storage unit 680 on the display unit 650, selecting an image to be printed from the displayed image data through a user's operation on the operating unit 660, sending the selected image data to the printer 100 via the communication unit 640, and causing the printer 100 to perform printing.

As illustrated in FIGS. 12A, 12B, and 12C, the external device 600 is configured to display a screen capable of displaying the number of sheets that can be printed on the display unit 650, and this screen includes an area 601 for indicating the number of sheet that the printer 100 can print, an area 602 for selecting an image to be printed, and a printing start button 603.

The number of sheets that the printer 100 can print, output from the printer 100 is displayed on the area 601 for indicating the number of sheet that the printer 100 can print. By visually recognizing the number of sheets that the printer 100 can print, displayed on the area 601, a user can determine how many more sheets can be printed by the printer 100. The area 602 for selecting an image to be printed is capable of displaying images desired to be printed by the user among images stored in the external device 600 such that they are selectable. This selecting operation is performed by the user clicking the area 602. The printing start button 603 is a button to be clicked when an image displayed on the area 602 is going to be printed. When the printing start button 603 is clicked, image data is transferred from the external device 600 to the printer 100 to and printed by the printer 100.

FIG. 12A illustrates a view illustrating a screen of the external device 600 in a state where the remaining battery level of the built-in battery 170 is 50%, and the external device 600 is not connected to the printer 100. FIG. 12B illustrates a view illustrating a screen of the external device 600 in a state where the remaining battery level of the built-in battery 170 is 50%, and the external device 600 capable of supplying power of 30 W is connected to the printer 100. FIG. 12C is a view illustrating a screen of the external device 600 in a state where the remaining battery level of the built-in battery 170 is 50%, and the external device 600 capable of supplying power of 60 W is connected to the printer 100.

When printing is to be started in the state where the remaining battery level of the built-in battery 170 is 50% and the external device 600 is not connected to the printer 100, "10 sheets can be printed" is displayed in the area 601 for indicating the number of sheet that the printer 100 can print, as illustrated in FIG. 12A. This enables the user to see that the printer 100 can print 10 more sheets.

When the external device 600 capable of supplying power of 30 W is connected to the printer 100 in the state shown in FIG. 12A, "23 sheets can be printed" is displayed in the area 601 for indicating the number of sheet that the printer 100 can print, as illustrated in FIG. 12B. This enables the user to quickly see that the number of sheets that the printer 100 can print has increased.

When the external device 600 capable of supplying power of 30 W is disconnected from the printer 100 in the state illustrated in FIG. 12B, "10 sheets can be printed" is displayed again in the area 601 for indicating the number of sheet that the printer 100 can print, as illustrated in FIG. 12A. This enables the user to quickly see that the number of sheets that the printer 100 can print has decreased.

When the external device 600 capable of supplying power of 60 W is connected to the printer 100 in the state where the remaining battery level of the built-in battery 170 is 50% and the external device 600 is not connected to the printer 100, the external device 600 enters the state illustrated in FIG. 12C. As illustrated in FIG. 12C, "∞ (infinite number of) sheets can be printed" is displayed in the area 601 for indicating the number of sheet that the printer 100 can print. This enables the user to see that printing can be performed irrespective of the remaining battery level.

As described above, irrespective of whether a power supply source that supplies power to the printer 100 is the built-in battery 170, the external power supply 300, or both the built-in battery 170 and the external power supply 300, the user can determine the number of sheets that the printer 100 can print corresponding to the power supply source.

Moreover, the external device 600 may be configured so as to display, on the display unit 650, an area for indicating a power mode, which indicates which one among the first to third power modes is the current power mode of the printer 100, as well as the area 601 for indicating the number of sheet that the printer 100 can print, the area 602 for selecting an image to be printed, and the printing start button 603. In this case, the printer 100 notifies the external device 600 which one among the first to third modes is the current power mode of the printer 100 via the communication unit 509. The external device 600 receives the notification of the power mode from the printer 100 via the communication unit 640 and provides an indication according to the received power mode. This enables the user to determine the current power mode of the printer 100.

Furthermore, only one image should not always be displayed on the area 602 for selecting an image to be printed, but a plurality of images may be displayed as thumbnails on the area 602 for selecting an image to be printed. This enables the user to select a plurality of desired images. When the number of selected images has exceeded the number of sheets that the printer 100 can print, a message to this effect may be displayed on the display unit 650. This enables the user to appropriately change the current power mode of the printer 100 such that the printer 100 can print the selected images.

Other Embodiments

While various embodiments of the present disclosure have been described with reference to example embodiments, it is to be understood that the invention is not limited to the disclosed example embodiments. The scope of the following claims is to be accorded the broadest interpretation so as to encompass all such modifications and equivalent structures and functions.

The printer 100 according to the embodiment described above may be configured to use, for example, a dry cell in place of the built-in battery 170 that is rechargeable. Moreover, although the printer 100 according to the embodiment described above is configured to be supplied with power from the AC mains power supply via the external power supply 300, the external power supply 300 may be replaced with a battery, and the printer 100 may be supplied with power from the external battery. In this case, it is preferred that the printer 100 has a battery level detection unit that detects the remaining battery level of the external power supply 300. As a result, for example, the number of sheets that the printer 100 can print in the second power mode can be calculated based on the remaining battery level of the built-in battery 170 and the remaining battery level of (or the amount of power supplied from) the external power supply 300.

Moreover, in the embodiment described above, the number of sheets that the printer 100 can print is calculated in the printer 100, and the number of sheets that the printer 100 can print is displayed in the external device 600. However, the external device 600 may obtain information such as the power mode, the remaining battery level, and the amount of power supplied from an external power supply from the printer 100 via the communication unit 640, and the CPU 610 of the external device 600 may calculate the number of sheets that the printer 100 can print. Thus, either the printer 100 or the external device 600 in the printing system 1000 may calculate and/or display the number of sheets that the printer 100 can print.

Furthermore, the printer 100 and the external device 600 may be configured as one printing apparatus, not separate devices, in the printing system 1000. For example, the printer 100 may include a display unit corresponding to the display unit 650 of the external device 600 as well as component elements such as the CPU 501 (calculation unit/control unit), temperature sensors such as the thermal head temperature sensor 505, the environmental temperature sensor 506, and the battery temperature sensor 507, the power supply control unit 510, and the battery level detection unit 512 as illustrated in FIG. 5. In this case, the display unit that displays the number of sheets that can be printed is provided in one printing apparatus, and therefore, without sending or receiving information via communication, one printing apparatus is able to calculate and display the number of sheets that can be printed.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2022-048226 filed on Mar. 24, 2022 which is hereby incorporated by reference wherein in its entirety.

What is claimed is:

1. A printing system comprising:
   a printing apparatus that performs printing in any of a plurality of power modes including (i) a first power mode in which the printing apparatus is supplied with power from a battery, and (ii) a second power mode in which the printing apparatus is supplied with power from both the battery and an external power supply;
   a battery level detection unit that detects a remaining battery level of the battery; and
   a calculation unit that, in the second power mode, calculates a number of sheets that the printing apparatus can print, based on the remaining battery level and an amount of power supplied from the external power supply.

2. The printing system according to claim 1, wherein the calculation unit calculates, in the first power mode, the number of sheets that the printing apparatus can print, based on the remaining battery level and not on the amount of power supplied from the external power supply.

3. The printing system according to claim 1, wherein the calculation unit calculates, in the second power mode, the number of sheets that the printing apparatus can print, based on a calibration curve indicating a relationship among the remaining battery level, the amount of power supplied from the external power supply, and the number of sheets that the printing apparatus can print.

4. The printing system according to claim 1, wherein the plurality of power modes includes the first power mode, the second power mode, and a third power mode in which the printing apparatus is supplied with power from the external power supply and not from the battery.

5. The printing system according to claim 4, wherein in a case where the printing apparatus performs the printing in the third power mode, the calculation unit calculates the number of sheets that the printing apparatus can print in the printing, based on the amount of power supplied from the external power supply.

6. The printing system according to claim 4, wherein in a case where the amount of power supplied from the external power supply is equal to or greater than a predetermined value, the printing apparatus performs the printing in the third power mode, and in a case where the amount of power supplied from the external power supply is smaller than the predetermined value, the printing apparatus performs the printing in the second power mode.

7. The printing system according to claim 4, further comprising a power supply control unit that includes a power amount detection unit that detects the amount of power supplied from the external power supply,
   wherein in a case where the external power supply is connected to the printing apparatus, the power supply control unit brings the printing apparatus into the second power mode or the third power mode according to the amount of power supplied from the external power supply detected by the power amount detection unit.

8. The printing system according to claim 7, wherein in a case where the amount of power supplied from the external power supply detected by the power amount detection unit is equal to or greater than a predetermined amount of power, the power supply control unit brings the printing apparatus into the third power mode, and in a case where the amount of power supplied from the external power supply detected by the power amount detection unit is smaller than the predetermined amount of power, the power supply control unit brings the printing apparatus into the second power mode.

9. The printing system according to claim 4, wherein in a case where the printing apparatus is in the third power mode, the calculation unit sets the number of sheets that the printing apparatus can print to infinity without calculating the number of sheets that the printing apparatus can print according to the amount of power supplied from the external power supply.

10. The printing system according to claim 4, wherein the battery is a secondary battery and is charged with power from the external power supply during the printing in the third power mode.

11. The printing system according to claim 1, further comprising a display unit that displays the number of sheets that the printing apparatus can print, as calculated by the calculation unit.

12. The printing system according to claim 11, further comprising an external device equipped with the display unit.

13. The printing system according to claim 1,
wherein the printing apparatus comprises:
a thermal head comprising a heating element; and
a temperature sensor that obtains temperature information about any of a temperature in the printing apparatus, a temperature of the battery, and a temperature of the thermal head,
wherein the calculation unit corrects the number of sheets that the printing apparatus can print, based on the temperature information.

14. The printing system according to claim 1,
wherein the external power supply is a battery, and
in a case where the printing apparatus performs the printing in the second power mode, the calculation unit calculates the number of sheets that the printing apparatus can print in the printing, based on the remaining battery level and the amount of power supplied from the external power supply.

15. The printing system according to claim 1,
wherein the printing apparatus comprises:
the battery level detection unit; and
the calculation unit.

16. A printing system comprising:
a printing apparatus that has, as power modes, (i) a first power mode in which the printing apparatus is supplied with power from a battery, (ii) a second power mode in which the printing apparatus is supplied with power from both the battery and an external power supply, and (iii) a third power mode in which the printing apparatus is supplied with power from the external power supply and not from the battery, and performs printing in any of the first power mode, the second power mode, and the third power mode;
a display unit; and
a control unit that, in a case where an amount of power supplied from the external power supply is equal to or greater than a predetermined value, controls the printing apparatus to perform printing in the third power mode and causes the display unit to indicate that the number of sheets that the printing apparatus can print is infinite.

17. The printing system according to claim 16,
wherein in a case where the printing apparatus is operating in the first power mode, the control unit causes the display unit to indicate that the number of sheets that the printing apparatus can print, based on a remaining battery level of the battery and in a case where the printing apparatus is operating in the second power mode, the control unit causes the display unit to indicate that the number of sheets that the printing apparatus can print, based on the remaining battery level of the battery and the amount of power supplied from the external power supply.

18. The printing system according to claim 16, further comprising an external device equipped with the display unit.

19. The printing system according to claim 16,
wherein the printing apparatus comprises:
the display unit; and
the control unit.

20. A control method for a printing apparatus that performs printing in any of a plurality of power modes including (i) a first power mode in which the printing apparatus is supplied with power supplied from a battery, and (ii) a second power mode in which the printing apparatus is supplied with power supplied from both the battery and an external power supply, the control method comprising:
obtaining a remaining battery level of the battery; and
in the first power mode, calculating a number of sheets that the printing apparatus can print, based on the remaining battery level, and in the second power mode, calculating the number of sheets that the printing apparatus can print, based on the remaining battery level and an amount of power supplied from the external power supply.

21. A control method for a printing apparatus that has, as power modes, (i) a first power mode in which the printing apparatus is supplied with power from a battery, (ii) a second power mode in which the printing apparatus is supplied with power supplied from both the battery and an external power supply, and (iii) a third power mode in which the printing apparatus is supplied with power supplied from the external power supply, and performs printing in any of the first power mode, the second power mode, and the third power mode, the control method comprising:
controlling the printing apparatus to perform printing in the third power mode in a case where an amount of power supplied from the external power supply is equal to or greater than a predetermined value; and
in a case where printing is performed in the third power mode, causing the display unit to indicate that the number of sheets that the printing apparatus can print is infinite.

* * * * *